United States Patent
Gu et al.

(10) Patent No.: US 7,572,394 B2
(45) Date of Patent: Aug. 11, 2009

(54) ELECTROPHORETIC DISPERSIONS

(75) Inventors: Haiyan Gu, Davis, CA (US); HongMei Zang, Sunnyvale, CA (US); Jiunn Jye Hwang, Taipei (TW); Xin Weng, Cotati, CA (US); Jack Hou, Fremont, CA (US); Chih-Yuan Liao, Taipei (TW); Shih-Wei Ho, San Jose, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 360 days.

(21) Appl. No.: 10/976,244

(22) Filed: Oct. 27, 2004

(65) Prior Publication Data

US 2005/0136347 A1    Jun. 23, 2005

Related U.S. Application Data

(60) Provisional application No. 60/517,719, filed on Nov. 4, 2003.

(51) Int. Cl.
*H01B 1/00* (2006.01)
*G03G 17/04* (2006.01)
*G09G 3/34* (2006.01)
*G02B 26/00* (2006.01)

(52) U.S. Cl. ............... 252/500; 430/32; 430/38; 345/107; 359/296

(58) Field of Classification Search .......... 345/107; 252/500
See application file for complete search history.

(56) References Cited

U.S. PATENT DOCUMENTS

| | | | |
|---|---|---|---|
| 3,006,921 A | 10/1961 | Weinmayr | |
| 3,281,426 A | 10/1966 | Tiers | |
| 3,612,758 A | 10/1971 | Evans et al. | |
| 3,870,517 A | 3/1975 | Ota et al. | |
| 4,059,451 A | 11/1977 | Oita et al. | |
| 4,077,936 A | 3/1978 | Tanaka et al. | |
| 4,085,137 A | 4/1978 | Mitsch et al. | |
| 4,093,534 A | 6/1978 | Carter et al. | |
| 4,094,911 A | 6/1978 | Mitsch et al. | |
| 4,285,801 A | 8/1981 | Chiang | |
| 4,620,916 A * | 11/1986 | Zwemer et al. | 359/296 |
| 4,655,897 A | 4/1987 | DiSanto et al. | |
| 4,772,103 A | 9/1988 | Saxe | |
| 5,177,476 A | 1/1993 | DiSanto et al. | |
| 5,260,435 A | 11/1993 | Sawada et al. | |
| 5,378,589 A | 1/1995 | Sawada et al. | |

(Continued)

FOREIGN PATENT DOCUMENTS

GB    1 492 983    11/1977

(Continued)

OTHER PUBLICATIONS

U.S. Appl. No. 60/493,703, filed Aug. 2003, Yang et al.

(Continued)

*Primary Examiner*—Mark Kopec
*Assistant Examiner*—Jaison P Thomas
(74) *Attorney, Agent, or Firm*—Howrey LLP

(57) ABSTRACT

This invention relates to improved electrophoretic dispersions and a method for improving the performance of an electrophoretic display.

25 Claims, 6 Drawing Sheets

U.S. PATENT DOCUMENTS

| | | | |
|---|---|---|---|
| 5,460,688 | A | 10/1995 | DiSanto et al. |
| 5,573,711 | A | 11/1996 | Hou et al. |
| 5,930,026 | A | 7/1999 | Jacobson et al. |
| 5,961,804 | A | 10/1999 | Jacobson et al. |
| 6,084,057 | A | 7/2000 | Gibbons et al. |
| 6,162,521 | A | 12/2000 | Falcone |
| 6,187,954 | B1 | 2/2001 | Falcone |
| 6,239,896 | B1 | 5/2001 | Ikeda |
| 6,262,833 | B1 | 7/2001 | Loxley et al. |
| 6,545,797 | B2 * | 4/2003 | Chen et al. ............. 359/296 |
| 6,549,327 | B2 | 4/2003 | Foucher et al. |
| 6,650,463 | B2 * | 11/2003 | Obikawa et al. ......... 359/296 |
| 6,672,921 | B1 | 1/2004 | Liang et al. |
| 6,693,620 | B1 | 2/2004 | Herb et al. |
| 6,781,745 | B2 | 8/2004 | Chung et al. |
| 6,806,995 | B2 | 10/2004 | Chung et al. |
| 6,822,782 | B2 | 11/2004 | Honeyman et al. |
| 6,933,098 | B2 | 8/2005 | Chan-Park et al. |
| 2002/0131152 | A1 | 9/2002 | Liang et al. |
| 2003/0169227 | A1 * | 9/2003 | Wu et al. ............... 345/107 |
| 2005/0136347 | A1 | 6/2005 | Gu et al. |
| 2005/0227155 | A1 | 10/2005 | Minami |

FOREIGN PATENT DOCUMENTS

| | | |
|---|---|---|
| WO | WO 01/067170 | 9/2001 |
| WO | WO 02/01281 | 1/2002 |
| WO | WO 02/065215 | 8/2002 |
| WO | WO 03/023510 | 3/2003 |
| WO | WO 03/038512 | 5/2003 |
| WO | WO 03/057360 | 7/2003 |
| WO | WO 03/058335 | 7/2003 |
| WO | WO 03/069403 | 8/2003 |
| WO | WO 03/097747 | 11/2003 |
| WO | WO 2004/012001 | 2/2004 |
| WO | WO 2004/068234 | 8/2004 |

OTHER PUBLICATIONS

U.S. Appl. No. 60/501,921, filed Sep. 2003, Yang et al.

U.S. Appl. No. 10/903,923, filed Jul. 2004, Yang et al.

U.S. Appl. No. 10/976,152, filed Oct. 2004, Hwang et al.

Allen, K. (Oct. 2003). Electrophoretics Fulfilled. *Emerging Displays Review: Emerging Display Technologies, Monthly Report*—Oct. 2003, 9-14.

Caporiccio, et al. (1983) Low Temperature Elastomeric Polyamides Containing Perfluorinated Polyether Building Blocks. *Makromol. Chem*. 184, pp. 935.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, l9.6.1.

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation available upon request).

Dalisa, A.L. (Jul. 1977) Electrophoretic Display Technology. *IEEE Trans. Dev.*, pp.827.

Diamond, A.S. editor. (2002) *Handbook of Imaging Materials*. Marcel Dekker.

Green, F.J. (1990) *The Signma-Aldrich Handbook of Stains, Dyes and Indicators*. Aldrich Chemical Co.

Gregory, P. et al (1991) *High Technology Applications of Organic Colorants*. Plenum Publishing Corp.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Hopper and V. Novotny, An Electrophoretic Display, Its Properties, Model, and Addressing. *IEEE Trans. Electr. Dev.*, 26(8):1148-1152, (1979).

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Oct. 2004) *Flexible and Roll-able Display/Electronic Paper—A Technology Overview*. Paper prersented at the METS 2004 Conference in Taipie, Taiwan.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., & Tseng, S. (Feb. 2003). *Microcup(R)LCD, An New Type of Dispersed LCD by A Roll-to-Roll Manufacturing Process*. Paper presented at the IDMC, Taipei, Taiwan.

Liang, R.C., Zang, H.M., Wang, X., Chung, J. & Lee, H., (Jun./Jul. 2004) *Format Flexible Microcup (R) Electronic Paper by Roll-to-Roll Manufacturing Process*. Presentation conducted at the 14th FPD Manufacturing Technology EXPO & Conference.

Malik, et al, (1991) Synthesis of Fluorinated Diisocyanates. *J. Org. Chem*. 56, pp. 3043.

Mashlyakovskiy, Leonid, et al. (1999) Fluoropolyethers End-Capped by Polar Functional Groups. I. Kinetic Approach to the Reaction of hydroxy-Terminated Fluoropolyethers with Cycloalphatic and Aromatic Diisocyanates. *Journal of Polymer Science: Part A*. vol. 37, pp. 557.

Mashlyakovskiy, Leonid, et al. (1999) Fluoropolyethers End-Capped by Polar Functional Groups. II. Effect of Catalyst and Reagents Concentration, Solvent Nature, and Temperature on Reaction Kinetics of α, ω-Bis(hydroxy)-Terminated Fluoropolyethers with Cycloalyphatic and Aromatic Diisocyanates. *Journal of Polymer Science: Part A*. vol. 37, pp. 2579.

Mashlyakovskiy, Leonid, et al. (2002) Fluoropolyethers End-Capped by Polar Functional Groups. III. Kinetics of the Reactions of Hydroxy-Terminated Fluoropolyethers and Model Fluorinated Alcohols with Cyclohexyl Isocyanate Catalyzed by Organotin Compounds. *Journal of Polymer Science: Part A*. vol. 40, pp. 3771.

Mossman, M.A., et al. (2002) Grey Scale Control of TIR Using Electrophoresis of Sub-Optical Pigment Particles, *SID 02 Digest*, pp. 522.

Mossman, M.A., et al (2001) New Reflective Color Display Techniques Based on Total Internal Reflection and Subtractive Color Filtering. *SID 01 Digest*, pp. 1054, (2001).

Mossman, M.A. et al (2001) New Reflective Display Based on Total Internal Reflection in Prismatic Microstructure. *SID IDRC Proceedings*, pp. 311.

Nikkei Microdevices. (Dec. 2002) Newly-Developed Color Electronic Paper Promises—Unbeatable Production Efficiency. *Nikkei Microdevices*, 3. (in Japanese, with English translation).

Ota, et al (1977) Developments in Electrophoretic Displays. *SID Proceedings*, 18, pp. 243.

Richmon, J.M. editor. (1990) *Cationic Surfactants: Organic Chemistry*. Surfactant Science Series vol. 34, Marcek Dekker.

Tonelli, et al. (2002) Perfluoropolyether Functional Oligomers: Unusual Reactivity in Organic Chemistry. *J. Fluorine Chemistry*. 118, pp. 107.

Wang, X., Kiluk, S., Chang, C., & Liang, R.C., (Jun. 2004) Microcup® Electronic Paper and the Converting Processes. *Advanced Display*, Issue 43, 48-51.

Wang, X., Kiluk, S., Chang, C., Wu, Y., & Liang, R.C. (Feb. 2004). Microcup (R) Electronic Paper and the Converting Processes. *ASID*, 10.1.2-26, 396-399, Nanjing, China.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

European Supplemental Search Report, Application No. 04796909. 2, Feb. 23,2008.

* cited by examiner

ELECTROPHORETIC DISPERSIONS

RELATED APPLICATION

This application claims the priority under 35 USC 119(e) of U.S. Provisional Application No. 60/517,719 filed on Nov. 4, 2003, the content of which is incorporated herein by reference in its entirety.

BACKGROUND OF THE INVENTION

1. Field of the Invention

This invention relates to improved electrophoretic dispersions and a method for improving the performance of an electrophoretic display.

2. Brief Description of Related Art

The electrophoretic display (EPD) is a non-emissive device based on the electrophoresis phenomenon of charged pigment particles suspended in a dielectric solvent. It was first proposed in 1969. The display usually comprises two plates with electrodes placed opposing each other and separated by spacers. One of the electrodes is usually transparent. A suspension composed of a dielectric solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, IEEE Trans. Electr. Dev., 26(8):1148-1152 (1979)), there are partitions between the two electrodes for dividing the space into smaller cells in order to prevent undesired movement of particles such as sedimentation. The microcapsule type EPD (as described in U.S. Pat. Nos. 5,961,804 and 5,930,026) has a substantially two dimensional arrangement of microcapsules each having therein an electrophoretic composition of a dielectric solvent and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488 filed on Mar. 3, 2000 (corresponding to WO01/67170), U.S. Ser. No. 09/606,654 filed on Jun. 28, 2000 (corresponding to WO02/01280) and U.S. Ser. No. 09/784,972 filed on Feb. 15, 2001 (corresponding to WO02/65215). The improved EPD comprises closed cells formed from microcups of well-defined shape, size and aspect ratio and filled with charged pigment particles dispersed in a dielectric solvent or solvent mixture.

As in liquid crystal and other displays, an EPD may be a segment display, a passive matrix display or an active matrix display, depending on the driving mechanism and circuitry design. The passive matrix driving system is one of the most cost effective driving mechanisms. The system has row electrodes on the top side and column electrodes on the bottom side, of the cells. In most cases, the top row electrodes and the bottom column electrodes are perpendicular to each other. Generally, a threshold voltage of at least ⅓ of the driving voltage is required to suppress or eliminate the undesirable crosstalk or cross-bias effect in adjacent pixels of a passive matrix display.

Crosstalk occurs when the particles in a cell are biased by the electric field of a neighboring cell. Widening the distance between adjacent cells may eliminate such a problem; but the distance may also reduce the resolution of the display.

Alternatively, the crosstalk problem can be lessened if a cell has a significantly high threshold voltage. A large gamma (or a steep slope) of the response-voltage characteristic curve is also desirable to increase the resolution of a passive matrix device. However, cells in EPDs formed using the electrophoretic materials and techniques currently available typically do not have the required response-voltage characteristics to prevent the undesirable movement of particles. As a result, the EPDs constructed from these materials and techniques usually cannot achieve high resolution.

Cross bias is another well-known problem associated with a passive matrix display. The voltage applied to a column electrode not only provides the driving bias for the cells in the scanning row, but it also affects the bias across the non-scanning cells in the same column. This undesired bias may force the particles of non-scanning cells to migrate to the opposite electrode. This undesirable particle migration causes visible optical density change and reduces the contrast ratio of the display.

In addition, in order to scan through all rows of electrodes in a frame within a reasonable time scale, a fast response is also highly desirable. However, none of the EPDs currently available has shown an acceptable threshold characteristics or response speed required.

Most electrophoretic dispersions do not have the required threshold characteristics to suppress or eliminate the undesirable cross-talk or cross-bias among adjacent pixels during matrix driving. Electrophoretic dispersions with a threshold characteristics have been reported by, for example, I. Ota, et al, in SID Proceedings, 18, 243 (1977) and Evans, et al, in U.S. Pat. No. 3,612,758. In most cases, the threshold voltage was achieved with trade-offs in, for example, response time, operating voltage, image uniformity or display longevity, probably due to irreversible flocculation and/or network formation, and sometimes, undesirable redox reaction(s) and/or electrodeposition at the electrode surface.

To suppress the cross effect, an additional conductor layer or grid electrode has been disclosed in, for example, IEEE Trans. Electr. Dev., p. 827, Jul. (1977) and U.S. Pat. Nos. 3,612,758, 4,655,897, 5,177,476 and 5,460,688, U.S. Ser. No. 10/242,335 filed on Sep. 11, 2002 (corresponding to WO 03/023510) and U.S. Ser. No. 10/282,444 filed on Oct. 28, 2002 (corresponding to WO 03/038512). However, the manufacturing cost for multilayer electrode structures is high. Alternatively, magnetic particles and a magnetic electrode have been disclosed in U.S. Pat. No. 6,239,896 (assigned to Canon) to provide the required threshold, but also at the expense of manufacturing cost.

Therefore, there is a need for a cost effective method for inducing or enhancing the threshold characteristics without the trade-offs in image uniformity and display longevity, and without the need of complex circuitry designs.

The content of each document referred to in this application is incorporated by reference into this application in its entirety.

SUMMARY OF THE INVENTION

The present invention is directed to a method for inducing or enhancing the threshold voltage of an electrophoretic display. The method comprises adding a threshold agent to an electrophoretic dispersion in which the electrophoretic pigment particles are dispersed in a dielectric solvent or solvent mixture. The threshold agent is soluble or dispersible in the dielectric solvent or solvent mixture of the electrophoretic dispersion.

The threshold agent may be (1) a charged species or a dispersion that carries a charge of opposite polarity to that of the electrophoretic pigment particles, or (2) a charged species or a dispersion that induces a charge of opposite polarity to the original charge of the electrophoretic pigment particles. In either case, the effective electrophoretic mobility or switching rate of the electrophoretic pigment particles is suppressed dramatically at a voltage lower than a threshold voltage since the effective charge density of the resultant electrophoretic pigment particles is significantly reduced or eliminated by the opposite charge carried or induced by the threshold agent.

In a first aspect of the invention, a threshold agent is added into an electrophoretic dispersion to induce or enhance the threshold characteristic of the electrophoretic particles. The threshold agent carries or induces a charge of opposite polarity to that of the electrophoretic particles and the charge provided by the threshold agent is relatively insensitive to the applied voltage. In contrast, the charge characteristics of the electrophoretic pigment particles or the charge controlling agent (CCA), if present, for the electrophoretic particles are significantly sensitive to the change of an applied voltage. In other words, the charge density (charge per unit volume) of the electrophoretic particles or the degree of dissociation of the CCA with the electrophoretic particles may increase significantly with increasing applied voltage. Because of the presence of the threshold agent, the net charge or electrophoretic mobility of the electrophoretic pigment particles is neutralized or suppressed to a large degree below a threshold voltage; however beyond the threshold voltage, the net charge or electrophoretic mobility of the electrophoretic particles increases significantly. In this embodiment, the resultant electrophoretic pigment particles, at an applied voltage higher than the threshold voltage, carry a charge of the same polarity as the original charge of the electrophoretic pigment particles before addition of the threshold agent. The threshold agent either carries an opposite charge or is capable of inducing an opposite charge to the electrophoretic pigment particles.

In a second aspect of the invention, the charge characteristics of the electrophoretic pigment particles or the degree of dissociation of the CCA with the electrophoretic particles is relatively insensitive to the change of the applied voltage whereas the charge provided by the threshold agent is significantly sensitive to the applied voltage. Because of the presence of the threshold agent, the net charge or electrophoretic mobility of the electrophoretic pigment particles is neutralized or suppressed to a large degree below a threshold voltage; however beyond the threshold voltage, the net charge or electrophoretic mobility of the electrophoretic pigment particles increases significantly. In this aspect of the invention, the resultant electrophoretic pigment particles, at an applied voltage higher than the threshold voltage, carry a charge of opposite polarity to the original charge of the electrophoretic pigment particles before addition of the threshold agent. The threshold agent either carries a charge opposite to the original charge of the electrophoretic pigment particles or is capable of inducing a charge opposite to the original charge of the electrophoretic pigment particles.

The threshold agent, as stated earlier, induces or enhances the threshold characteristics of an electrophoretic dispersion. It may be any material which is soluble or dispersible in the dielectric solvent or solvent mixture of an electrophoretic dispersion and carries or induces a charge opposite to that of the electrophoretic pigment particles. The threshold agent may be sensitive or insensitive to the change of applied voltage. In the context of the present invention, the term "threshold agent" may broadly include dyes or pigments, electrolytes or polyelectrolytes, polymers, oligomers, surfactants, charge controlling agents and any materials which meet the criteria described above.

The threshold agent may be present in the form of dispersed particles in the dielectric solvent or solvent mixture of the electrophoretic dispersion. In this case, the threshold agent preferably has an average particle diameter smaller than $1/4$, more preferably smaller than $1/10$, of that of the electrophoretic pigment particles. In this case, the threshold agent or dispersion may be colorless or colored. If colored, it is preferable that the threshold agent is white or of the same color as the dye or pigment used in the electrophoretic dispersion. When a dye or pigment is used as the threshold agent, the dye or pigment threshold agent may also be present in the form of particles, micelles or soluble molecules.

In general, the threshold agent is preferably present in the amount of from about 0.01% to about 20 wt %, more preferably about 0.03 to about 10 wt %, most preferably about 0.1 to about 3 wt %, based on the dry weight of the electrophoretic pigment particles.

A few specific examples of the method are described in this application as embodiments of the invention. It is understood that the scope of the present invention broadly encompasses the method based on the principle of the invention and is not in any way limited to the specific embodiments described below.

In one embodiment, the threshold agent is a dye or pigment.

In another embodiment, the threshold agent is an electrolyte or polyelectrolyte.

In a further embodiment, the threshold agent is a polymer, oligomer or surfactant.

In still a further embodiment, a protective colloid or polymeric stabilizer is used to stabilize the electrophoretic pigment particles at an applied voltage lower than the threshold voltage. The protective colloid or polymeric stabilizer is preferably chemically bonded to the electrophoretic pigment particles.

The third aspect of the invention is directed to an electrophoretic dispersion produced from the method of the present invention. For example, the electrophoretic dispersion may comprise electrophoretic pigment particles dispersed in a dielectric solvent or solvent mixture and a threshold agent. The threshold agent carries or induces a charge opposite to that of the electrophoretic pigment particles. The charge characteristics provided by the threshold agent are relatively insensitive to the change of the applied voltage if the charge characteristics or mobility of the electrophoretic pigment particles is sensitive to the change of the applied voltage, or vice versa. The threshold agent is preferably adsorbed on the electrophoretic particles.

The fourth aspect of the invention is directed to an electrophoretic display comprising display cells filled with an electrophoretic dispersion produced from the method of the present invention.

DETAILED DESCRIPTION OF THE INVENTION

Definitions

Unless defined otherwise in this specification, all technical terms are used herein according to their conventional definitions as they are commonly used and understood by those of ordinary skill in the art. Tradenames are identified for materials used and their sources are also given.

The term "threshold voltage", in the context of the present invention, is defined as the minimum voltage required for achieving an observable display contrast ratio within the time scale of scanning row(s) of cells (in a passive matrix display). It is the maximum bias voltage that may be applied to a cell without causing movement of particles between two electrodes on opposite sides of the cell.

Figure 6:
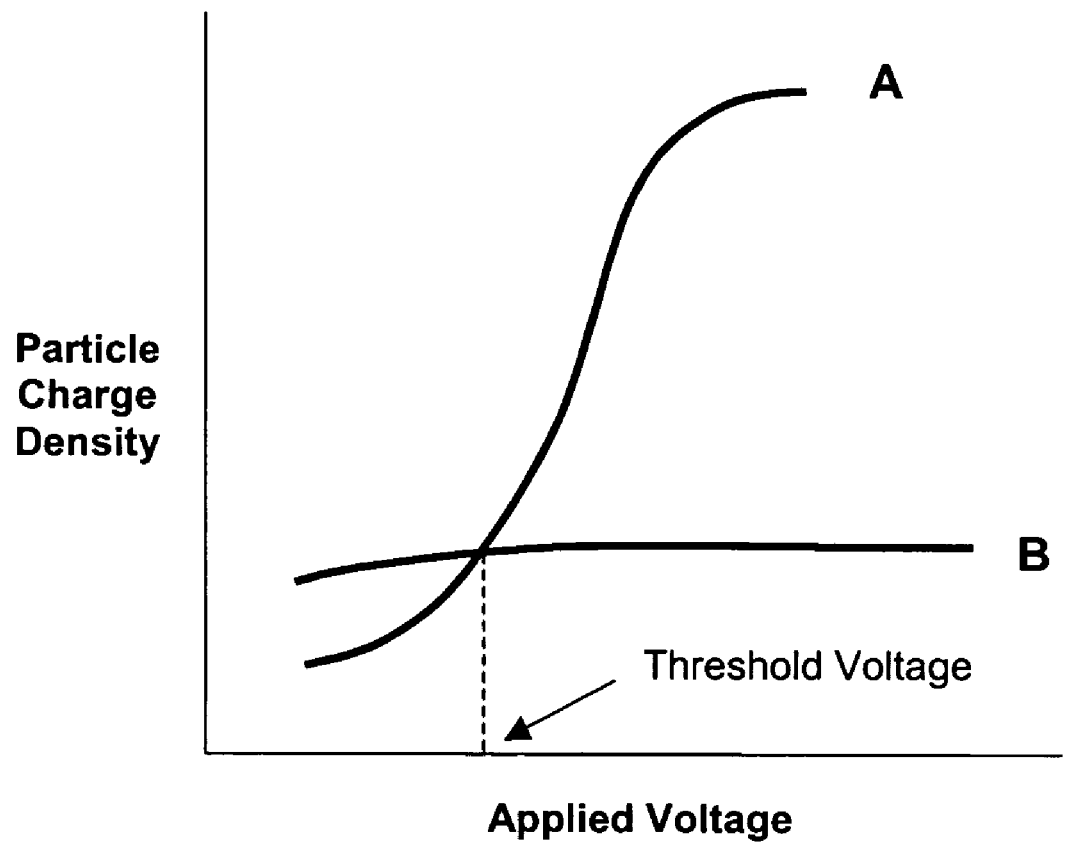
FIG. 6 is a general graph illustrating the concept of the present invention.

The phenomenon of "charge characteristics or mobility significantly sensitive to the change of applied voltage" is illustrated in FIG. 6. Line A represents a material A the charge of which is significantly sensitive to the change of the applied voltage whereas Line B represents a material B carrying or inducing a charge of opposite polarity to that of material A and the charge of material B is relatively insensitive to the change of the applied voltage. At a voltage below the threshold voltage, the charge of material A and the charge carried or induced by material B are neutralized or suppressed by each other; however, beyond the threshold voltage, the charge of material A increases significantly with increasing applied voltage and becomes the dominant charge.

Not to be bound by theory, the threshold agent is preferably adsorbed on the electrophoretic particles and the net charge density is the sum of the two types of charges: one from the electrophoretic particles themselves and the other from the threshold agent. The combined effect of the two types of charges results in the desirable threshold characteristics for passive matrix driving.

The term "significantly sensitive to the applied voltage" refers to a charged material which shows more than about $(120/V_{op})$%, preferably more than about $(150/V_{op})$%, of change in the charge density or electrophoretic mobility when there is a change of one volt of the applied voltage beyond the threshold voltage. $V_{op}$ is the operation voltage of a passive matrix electrophoretic display (PMEPD). For instance, if the operation voltage of a PMEPD is 30 volts, a change of more than (120/30)%=4% per volt, preferably more than (150/30)%=5% per volt, of net charge density or electrophoretic mobility is considered significantly sensitive to applied voltage. Similarly, if the operation voltage of the PMEPD is 60 volts, a change of more than (120/60)%=2.0% per volt, preferably more than (150/60)%=2.5% per volt, beyond the threshold voltage is considered significantly sensitive.

The term "relatively insensitive to the applied voltage" refers to a charged material which shows less than about $(30/V_{op})$%, preferably less than about $(15/V_{op})$%, of a change in the charge density or electrophoretic mobility when there is a change of one volt of the applied voltage beyond the threshold voltage. For instance, if the operation voltage of a PMEPD is 30 volts, a change of less than (30/30)%=1% per volt, preferably less than (15/30)%=0.5% per volt, of net charge density or electrophoretic mobility is considered relatively insensitive to applied voltage. Similarly, if the operation voltage of the PMEPD is 60 volts, a change of less than (30/60)%=0.5% per volt, preferably less than (15/60)%=0.25% per volt, beyond the threshold voltage is considered relatively insensitive.

The term "contrast ratio" is defined as the ratio of the reflectance of an electrophoretic display at the minimum optical density (Dmin) to the reflectance at the maximum optical density (Dmax) of the display background.

The term "gamma" is defined as the slope of the optical response vs. applied voltage curve.

The term "alkyl" refers to a linear, branched or cyclic hydrocarbon chain. Unless otherwise indicated, the "alkyl" group, in the context of the present application, preferably has 1 to 20, preferably 1 to 12, carbon atoms. Examples of "alkyl" may include methyl, ethyl, cyclohexyl, octyl, n-decyl and the like which is optionally unsaturated, such as ethenyl, 3-hexenyl or the like.

The term "aryl" refers to an organic radical derived from an aromatic ring preferably having 6 to 18 carbon atoms including, but not limited to, phenyl, biphenyl, naphthyl, anthracenyl and the like.

I. Electrophoretic Pigment Particles

The term "electrophoretic pigment particles" or "electrophoretic particles", in the context of the present application, may broadly include primary pigment particles, electrophoretic pigment microparticles, core-shell particles, hollow particles that scatter light, and the like.

Suitable primary pigment particles are well known in the art. They are preferably white, and may be organic or inorganic pigments, such as $TiO_2$. If colored pigment particles are used, they may be formed from organic or inorganic pigments known in the art. Particle size of the primary pigment particles is preferably in the range of about 0.01 to about 5 microns, more preferably in the range of about 0.05 to about 2 microns. The primary pigment particles may exhibit a native charge, or may be charged explicitly using a charge controlling agent or may acquire a charge when suspended in the dielectric solvent. Suitable charge controlling agents are well known in the art; they may be polymeric or non-polymeric in nature and may also be ionic or non-ionic, including ionic surfactants.

Suitable charged primary pigment dispersions may be manufactured by any of the well-known methods including grinding, milling, attriting, microfluidizing and ultrasonic techniques.

The "electrophoretic pigment microparticles" referred to in this section are prepared from a microparticle forming/microencapsultion process. Such a process may be accomplished chemically or physically. Typical microparticle forming/microencapsulation processes include interfacial polymerization, in-situ polymerization, phase separation, coacervation, electrostatic coating, spray drying, fluidized bed coating, solvent evaporation and the like.

Electrophoretic pigment microparticles prepared from any of the processes known in the art may be used in the present invention.

One of the preferred microparticle forming processes is disclosed in the co-pending applications, U.S. Ser. No. 10/335,051 filed on Dec. 31, 2002 (corresponding to WO 03/57360), U.S. Ser. No. 10/335,210 filed on Dec. 31, 2002 (corresponding to WO 03/58335) and U.S. Ser. No. 10/632,171 filed on Jul. 30, 2003.

Briefly, the process may comprise:
(a) preparing a solution comprising a polymer precursor such as a monomer or oligomer ("precursor/internal phase" or phase "I");
(b) emulsifying the precursor/internal phase into a fluorinated solvent or solvent mixture ("continuous phase" or phase "F"); and
(c) forming electrophoretic pigment microparticles by hardening the emulsion.

The hardening of the emulsion may be accomplished by polymerization/crosslinking of the monomers or oligomers, including interfacial and/or in-situ polymerization/crosslinking. The polymer precursor(s) may be partially polymerized/crosslinked in step (a) before the emulsification step (b).

A pigment, in the form of particles, may be predispersed in the precursor/internal phase. The pigment may be one of those primary pigments known in the art. This type of microparticles is referred to as pigment-containing microparticles.

Suitable monomers or oligomers for interfacial and in-situ polymerization/crosslinking may include multifunctional isocyanates, thioisocyanates, epoxides, acid chlorides, chloroformates, alkoxysilanes, anhydrides, alcohols, thiols, amines and precondensates thereof. The monomer or oligomer is present in the amount of from 5 to 300% by weight, more preferably from 50 to 150% by weight and most preferably from 80 to 120% by weight, based on the total solid of the electrophoretic pigment microparticles.

Suitable fluorinated solvents for step (b) generally have low vapor pressure, low viscosity and a dielectric constant in the range of about 1.7 to about 30, more preferably about 1.7 to about 5. Examples of suitable fluorinated solvents may include, but are not limited to, perfluorinated solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as perfluoropolyethers HT series and hydrofluoropolyethers (ZT series) from Solvay Solexis, FC-43 (heptacosafluorotributylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly(perfluoropropylene oxide) from TCI America (Portland, Oreg.), poly(chlorotrifluoroethylene) such as Halocarbon Oils from Halocarbon Product Corp. (River Edge, N.J.) and Demnum lubricating oils from Daikin Industries. Perfluoropolyethers and hydrofluoropolyethers such as Solvay Solexis HT-170, HT-200, HT-230, ZT-180 and Dupont trifluoro(trifluoromethyl)-oxirane homopolymers (such as K-6 and K-7 fluids) are particularly useful.

To facilitate the emulsification process, a fugitive solvent or diluent may be used to reduce the viscosity of the precursor/internal phase and it is removed later by heat and/or vacuum during or after the emulsification step.

In the preparation of the fluorinated solution (phase "F"), a protective colloid or dispersant may be optionally added to improve the dispersion stability and control the particle size and particle size distribution of the microparticles. The preferred protective colloids or dispersants are disclosed in the co-pending application, U.S. Ser. No. 10/335,051 filed Dec. 31, 2003.

Optionally, a charge controlling agent (CCA) may also be added in the microparticle forming process. The charge controlling agents, such as those acid-base or donor-acceptor type of CCAs as disclosed in the co-pending application, U.S. Ser. No. 10/335,210 filed Dec. 31, 2002 and the fluorinated quaternary salts or the fused ring or polynuclei derivatives or isomers thereof as disclosed in U.S. Ser. No. 10/632,171 filed Jul. 30, 2003, are preferred.

The CCA may be soluble or dispersible in phase "F" and added in the emulsification step (b). Optionally they may also be added in step (c) of the process. The CCA preferably comprises a reactive functional group for interfacial polymerization/crosslinking. Suitable reactive CCAs have reactive functional groups such as unsaturated double bonds including, but not limited to, vinyls, dienes, acrylates or methacrylates, primary or secondary amines, anilines, ureas, thioureas, alcohols, thiols, isocyanates, thioisocyanates, imines, epoxides, acid anhydrides, acid chlorides, chloroformates and the like.

Optionally a fluorinated organometallic compounds may be used as a CCA and added in step (b) of the microparticle forming process. Preferred fluorinated metal organic compounds may include, but are not limited to, fluorinated metal naphthalocyanine or phthalocyanine dyes (such as CuPc—$R_f$ wherein $R_f$ may be $C_nH_xF_{2n+1-x}$ wherein n=1-18, preferably 4-12 and x is adjusted so that the fluorine content is no less than 10 wt % by weight, preferably no less than 40 wt % by weight), fluorinated quinolinol metal complexes and metal perfluoroacetoacetonates. The preferred metals may include Cu, Co, Ni, Ti, Fe, Mg, Zn, Zr and Al, with Cu being the most preferred. Fluorinated metal phthalocyanine and naphthalocyanine dyes may be prepared by the procedures as disclosed in U.S. Pat. No. 3,281,426 (1966).

A second monomer or oligomer may also optionally be added to further harden the microparticles by, for example, in-situ radical and/or condensation polymerization during or after the interfacial polymerization/crosslinking step. Suitable second monomers or oilgomers for the in-situ polymerization/crosslinking reaction in the precursor/internal phase may include monomers for radical or ionic polymerization such as vinyls, acrylates, methacrylates, styrenes, allyls, vinylethers and multifunctional derivatives thereof and monomers for condensation polymerization such as polyols, polythiols, anhydrides, polyamines, isocyanates, thioisocyanates or epoxides.

The size of the electrophoretic pigment particles particularly the pigment-containing microparticles typically ranges from about 0.01 to about 5 microns, preferably from about 0.05 to about 2 microns.

Examples of core-shell particles may be found in, for example, a co-pending application, U.S. Ser. No. 10/364,270 filed on Feb. 10, 2003 (corresponding to WO 03/69403).

In most cases, the charge characteristics of electrophoretic pigment particles and their sensitivity to the applied voltage are largely dependent on the nature and the concentration of the CCA system used. In some cases, an electrolyte or polyelectrolyte may form an electric double layer at the electrophoretic particles/dielectric solvent interface. The effective potential or charge density of the particles is dependent on the degree of the dissociation of the counterions in the electric field. In some cases, the interface of electrophoretic pigment particles may be rich in electron donor or hydrogen acceptor and when the continuous phase comprises an electron acceptor or hydrogen donor, the pigment particles tend to develop a positive charge. In contrast, the pigment particles may exhibit a negative charge if the continuous phase comprises an electron donor or hydrogen acceptor, and the particle interface comprises an electron acceptor or hydrogen donor. It is generally believed that the charge characteristics or potential of the electric double layer on the particle surface resulted from the electrolyte or hydrogen donor/acceptor mechanism are more sensitive to the changes in applied voltage or field strength. In contrast, the charge characteristics or potential of the electric double layer resulted from the electron donor/acceptor mechanism is relatively weaker and less sensitive to the voltage changes.

It is now found that distinct threshold characteristics useful for passive matrix driving EPDs may be achieved by a careful combination of a strongly voltage-sensitive surface charge and a relatively voltage-insensitive surface charge of opposite polarity.

II. Dielectric Solvents

Suitable dielectric solvents are solvents of low viscosity, low vapor pressure and low dielectric constant. Particularly suitable solvents are fluorinated solvents having low vapor pressure, low viscosity and a dielectric constant in the range of about 1.7 to about 30, more preferably about 1.7 to about 5. Specific examples are given in the previous section for the microencapsulation process.

In addition to the electrophoretic pigment particles, a contrasting colorant may be used in the electrophoretic dispersion of the present invention. The contrast colorant may be formed from dyes or pigments.

III. Threshold Agents

The present invention is directed to a method for inducing or enhancing the threshold voltage of an electrophoretic display. The method comprises adding a threshold agent to an electrophoretic dispersion in which the electrophoretic pigment particles are dispersed in a dielectric solvent or solvent mixture. The threshold agent may be soluble or dispersible in the dielectric solvent or solvent mixture of the electrophoretic dispersion and carries or induces a charge opposite to that of the electrophoretic pigment particles in the electrophoretic dispersion.

It is believed that the threshold agent carries or induces an opposite charge at the surface of the electrophoretic pigment particles and suppresses the electrophoretic mobility of the electrophoretic pigment particles to a negligible degree, below a threshold voltage.

In a first aspect of the invention, the charge characteristics of the electrophoretic pigment particles or the degree of dissociation of a charge controlling agent (CCA) with the electrophoretic pigment particles is significantly sensitive to the change of the applied voltage. In other words, the charge characteristics of the electrophoretic pigment particles or the degree of dissociation of the charge controlling agent (CCA) with the electrophoretic pigment particles may increase significantly with increasing applied voltage. In this scenario, the charge carried or induced by the threshold agent is relatively insensitive to the applied voltage. Because of the presence of the threshold agent, the net charge or electrophoretic mobility of the electrophoretic pigment particles is neutralized or suppressed to a large degree below the threshold voltage; however beyond the threshold voltage, the net charge or electrophoretic mobility of the electrophoretic pigment particles increases significantly. In this embodiment, the resultant electrophoretic pigment particles, at an applied voltage higher than the threshold voltage, carry a charge of the same polarity as the original charge of the electrophoretic pigment particles before addition of the threshold agent.

In a second aspect of the invention, the charge characteristics of the electrophoretic pigment particles or the degree of dissociation of a charge controlling agent (CCA) with the electrophoretic pigment particles is relatively insensitive to the change of the applied voltage whereas the opposite charge carried or induced by the threshold agent is significantly sensitive to the applied voltage. Because of the presence of the threshold agent, the net charge or electrophoretic mobility of the electrophoretic pigment particles is also neutralized or suppressed to a large degree below the threshold voltage; however beyond the threshold voltage, the net charge or electrophoretic mobility of the electrophoretic pigment particles increases significantly. In this aspect of the invention, the resultant electrophoretic pigment particles, at an applied voltage higher than the threshold voltage, carry a charge of the same polarity as that carried or induced by the threshold agent.

The threshold agent, as stated earlier, may be any material which is soluble or dispersible in the dielectric solvent or solvent mixture of an electrophoretic dispersion and carries or induces a charge of opposite polarity to that of the electrophoretic pigment particles. The threshold agent may be significantly sensitive or relatively insensitive to the change of the applied voltage. In the context of the present invention, the term "threshold agent" may broadly include any materials which meet the criteria describe above.

In one preferred embodiment, a fluorinated threshold agent is used, particularly when the dielectric solvent is highly fluorinated such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as perfluoropolyethers HT series and hydrofluoropolyethers ZT series.

The threshold agent may be present in the form of particles dispersible in the dielectric solvent or solvent mixture of the electrophoretic dispersion. In this case, the particles of the threshold agent preferably have a particle size at least about 4 times, more preferably at least about 10 times, smaller than the electrophoretic pigment particles.

Specific suitable threshold agents, may include, but are not limited to, dyes or pigments, electrolytes or polyelectrolytes, polymers, oligomers, surfactants and charge controlling agents.

Examples of suitable dyes or pigments may include, but are not limited to, fluorinated phthalocyanine, naphthalocyanine, anthraquinone, perylene, quinacridone, diketopyrrolopyrrole, naphthalimide, diazine, polyaniline and porphyrin dyes. Some of these dyes or pigments are disclosed in, for example, in co-pending applications, U.S. Ser. No. 10/439,428 filed May 15, 2003, U.S. Ser. No. 60/493,703 filed Aug. 8, 2003 and U.S. Ser. No. 60/501,921 filed Sep. 10, 2003, U.S. Pat. Nos. 3,281,426, 3,006,921, 5,260,435 and 5,378,589. Their synthesis may also be found in these references.

The concentration of the dye or pigment is about 0.01 to about 20% by weight, preferably about 0.03 to about 10 wt %, even more preferably about 0.1 to about 3 wt % based on the total dry weight of the electrophoretic pigment particles.

Examples of suitable electrolytes or polyelectrolytes may include salts of Li, Zr, Zn, Ni, Cu, Co, B, Al, pyridinium, imidazolium, ammonium, oxium, sulfonium, phosphonium and the like. The anions of the electrolytes or polyelectrolyes may include triflate, carboxylate, iodide, bromide, chloride, fluoride, $NO_3^-$, $PF_5^-$, $AsF_5^-$, $SbF_5^-$ and the like.

Among the electrolytes and polyelectrolytes, lithium and pyridinium salts have been found to be particularly suitable, especially those lithium salts expressed by the following formula:

$$(Li^+)_n X^{n-} \qquad (I)$$

wherein:

n is an integer, preferably 1, 2 or 3; and

X is an anion or a polymeric anion.

In Formula (I), X may include, but are not limited to, an inorganic anion such as $F^-$, $BF_4^-$, $PF_6^-$, $AsF_6^-$, $SbF_6^-$; optionally fluorinated aliphatic carboxylates or sulfonates; anions of optionally fluorinated sulfonyl imides; anions of optionally fluorinated aromatic carboxylates or sulfonates or fluoropolyether substituted carboxylates or sulfonates.

Some of the lithium salts, such as lithium triflate and lithium bis(trifluoromethanesulfonyl)imide are commercially available. The lithium salts may also be synthesized by methods known in the art. For example, the lithium salt may be formed by reacting a lithium hydroxide or lithium halide with $M^+X^-$ wherein $X^-$ is an anion as defined above and M is hydrogen or a monovalent metal, such as Ag. The synthesis of some Li salts are shown in Preparations 6 and 7 in the present application.

Among the salts having a nitrogen center, pyridinium salts comprising a highly fluorinated substituent is particularly useful when the dielectric solvent is also highly fluorinated. The quaternary salts in general may be found in "Cationic Surfactants: Organic Chemistry", Surfactant Science Series Vol. 34 (1990), Marcel Dekker; "High Technology Applications of Organic Colorants" by P. Gregory, (1991), Plenum Publishing Corp.; "The Sigma-Aldrich Handbook of Stains, Dyes, and Indicators" by F. J. Green, (1990), Aldrich Chemical Co.; and "Handbook of Imaging Materials" edited by A. S. Diamond and D. S. Weiss; (2001), Marcel Dekker. The specific pyridinium salts suitable for this invention are disclosed in the copending application, U.S. Ser. No. 10/632,171 filed Jul. 30, 2003.

The synthesis of some pyridinium salts are shown in Preparations 2-5 in the present application.

The concentration of the electrolyte or polyelectrolyte used in the present invention is about 0.01% to about 5% by weight, preferably from about 0.02% to about 1% by weight, based on the total dry weight of the electrophoretic pigment particles.

Examples of surfactants may include, but are not limited to, oligomers or polymers comprising a functional group capable of forming hydrogen bonding, acid-base interaction, donor-acceptor interaction, metal-ligand interaction or Coulombic interaction with the functional group(s) on the surface of particles. Suitable functional groups may include, but are not limited to, —OR, —COOR, —CONRR$^1$, —OCONRR$^1$, —NR$^2$CONRR$^1$, —SO$_2$NRR$^1$, —NRR$^1$, wherein R, R$^1$ and R$^2$ are independently hydrogen, alkyl, aryl, alkylaryl, arylalkyl or a halogenated, particularly fluorinated, derivative thereof. Optionally, R, R$^1$ or R$^2$ may comprise a heteroatom such as N, S, Si or a metal ion, or an ionic group such as ammonium, pyridinium, sulfonate, sulfate, carboxylate or phosphate.

The molecular weight of the surfactant may range from about 200 to about 5,000,000, preferably from about 300 to about 100,000, more preferably from about 500 to about 50,000.

In the case of electrophoretic pigment microparticles, the surfactant may be added into the electrophoretic dispersion during or after the preparation of the precursor/internal phase in the microparticle forming process.

Halogenated, particularly fluorinated, surfactants are especially useful when a halogenated or fluorinated dielectric solvent is used in the electrophoretic dispersion. Particularly suitable surfactants useful as a threshold agent may include, but are not limited to, those derived from Krytox ester (from Du Pont), Fluorolink D having the formula of $HOH_2CCF_2O(CF_2CF_2O)_y(CF_2O)_zCF_2CH_2OH$ (available from Solvay Solexis) or those derived from Fluorolink L having the formula of $H_3CO(O)CCF_2O(CF_2CF_2O)_y(CF_2O)_zCF_2C(O)OCH_3$ (also available from Solvay Solexis).

The synthesis of such surfactants is demonstrated in Preparation 1, 11 and 12 below. Other analogous compounds may be similarly prepared as demonstrated in U.S. Application No. 60/517,520 filed on Nov. 4, 2003 and an application concurrently filed and identified as U.S. application Ser. No. 10/976,152, filed Oct. 27, 2004.

The concentration of the surfactant used in the present invention may be about 0.01 wt % to about 20 wt %, preferably from about 0.03 wt % to about 10 wt %, more preferably about 0.1 to about 3 wt % based on the total dry weight of the electrophoretic pigment particles.

The invention is also directed to an electrophoretic dispersion produced from the method of the present invention. For example, the electrophoretic dispersion may comprise electrophoretic pigment particles dispersed in a dielectric solvent or solvent mixture and a threshold agent which is soluble or dispersible in the dielectric solvent or solvent mixture of the electrophoretic dispersion and carries a charge opposite that of the electrophoretic pigment particles. The threshold agent is insensitive to the change of an applied voltage if the electrophoretic pigment particles are sensitive to the change of the applied voltage, or vice versa.

The invention is also directed to an electrophoretic display comprising display cells filled with an electrophoretic dispersion produced from the method of the present invention.

The display referred to in this application may be an electrophoretic display prepared by the microcup technology as described in WO01/67170 or an electrophoretic display prepared by a microencapsulation process as described in U.S. Pat. Nos. 5,961,804 and 5,930,026 or the copending application, U.S. Ser. No. 60/443,893 filed on Jan. 30, 2003.

The electrophoretic pigment microparticles without a pigment contained therein are particularly useful for an electrophoretic display driven by the TIR switching mode as described in M. A. Mossman, et al, SID 01 Digest pp. 1054 (2001); SID IDRC proceedings, pp. 311 (2001); and SID'02 Digest, pp. 522 (2002). In the display with the TIR switching mode, the reflection of light is modulated by moving the microparticles into optical contact with the prismatic reflector surface.

The display may also have the traditional up/down switching mode, the in-plane switching mode or the dual switching mode. If the displays are driven by the traditional up/down switching mode or the dual switching mode, both the top and bottom layers are electrode plates, and at least one of which is transparent and the cells are enclosed between the two electrode plates. The up/down mode allows the electrophoretic pigment particles to move in the vertical (up/down) direction whereas the dual switching mode allows the electrophoretic pigment particles to move in both the vertical (up/down) direction and the planar (left/right) direction. In the display having the in-plane switching mode, the cells are sandwiched between an insulator layer and an electrode plate. The in-plane switching mode allows the electrophoretic pigment particles to move in the planar direction only.

EXAMPLES

Preparation 1: Preparation of $R_f$-amine

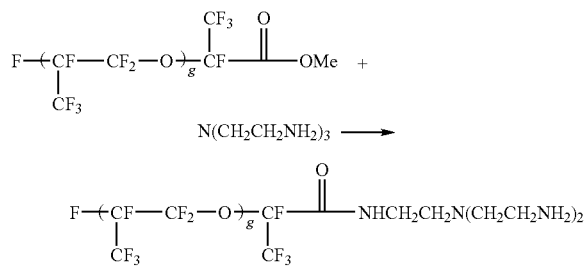

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichloro-trifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm$^{-1}$ and the appearance of C=O vibration for the amide product at 1695 cm$^{-1}$. Solvents were removed by rotary evaporation followed by vacuum stripping at 100° C. for 4-6 hours. The crude product was then dissolved in 50 ml of PFS-2 solvent and extracted with 20 ml of ethyl acetate three times, then dried to yield 17 gm of purified product ($R_f$-amine1900) which showed excellent solubility in HT-200 (perfluoropolyether from Solvay Solexis).

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) were also synthesized according to the same procedure. $R_f$-amine350 was also prepared by the same procedure, except that the Krytox®) methyl ester was replaced by $CF_3CF_2CF_2COOCH_3$ (from SynQuest Labs, Alachua, Fla.).

Preparation 2: Preparation of F8POH

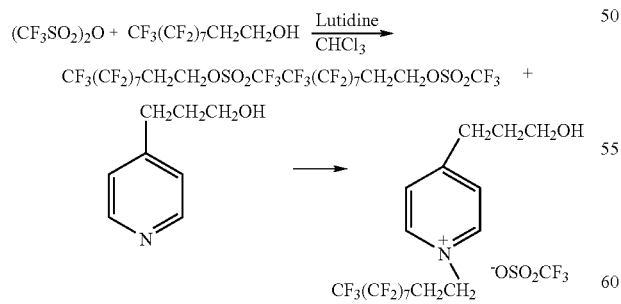

3.21 Gm (30.0 mmol) of 2,6-lutidine (Aldrich) and 11.6 gm (25.0 mmol) of 1H, 1H, 2H, 2H-perfluorodecanol [$CF_3(CF_2)_nCH_2CH_2OH$, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added dropwise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H, 1H, 2H, 2H-perfluorodecyl triflate, $CF_3(CF_2)_nCH_2CH_2OSO_2CF_3$, n=7) was obtained.

5.96 Gm (10 mmol) of the thus obtained 1H, 1H, 2H, 2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(3,3,4,4,5,5,6,6,7,7,8,8,9,9,10,10-heptadecafluoro-decyl)-4-(3-hydroxy-propyl)-pyridinium trifluoro-methanesulfonate (n=7, hereinafter referred to as F8POH), was obtained.

Preparation 3: Preparation of PNC1

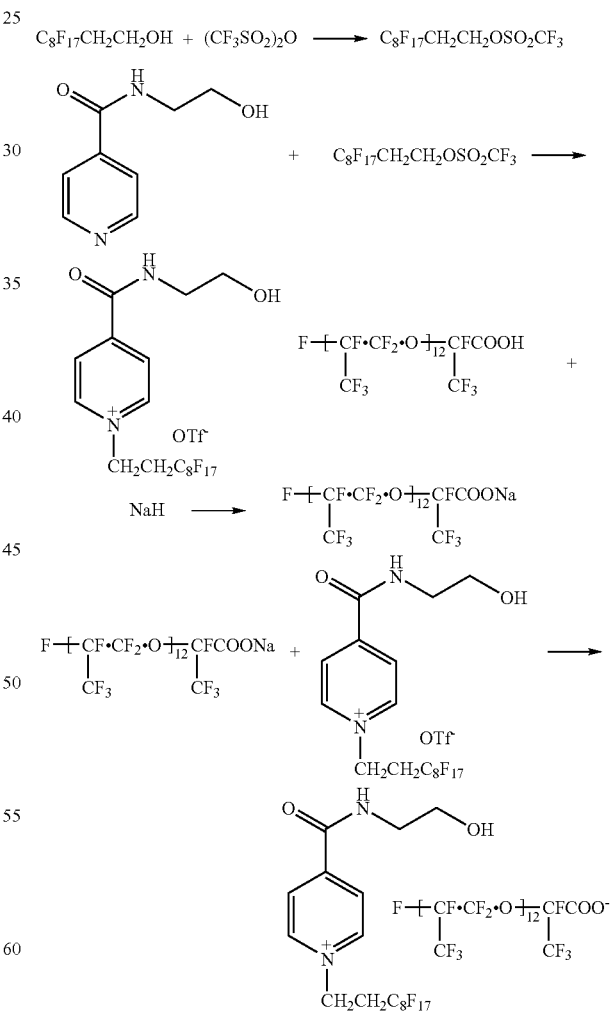

PNC1

18 Gm (30 mmol) of the 1H, 1H, 2H, 2H-perfluorodecyl triflate was dissolved in 50 ml of Freon 113 and 100 ml of acetonitrile. 5 Gm (30 mmol) of N-(2-hydroxyethyl)isonicotinamide was added. The mixture was heated to 50° C. and continuously stirred for 12 hours. The solvent was stripped off under vacuum and 20 gm of a white waxy solid, (N-(2-hydroxyethyl)-N'-1H, 1H, 2H, 2H-perfluorodecyl isonictinamide triflate), was obtained. The purity was confirmed by $^1$H NMR and $^{19}$F NMR.

16.4 Gm of the obtained sodium Krytox® carboxylate salt and 5 gm of N-(2-hydroxyethyl)-N'-1H, 1H, 2H, 2H-perfluorodecyl isonictinamide triflate were dissolved in 40 ml and 10 ml of methanol, respectively. These two solutions were mixed together and phase separation formed immediately. 30 Ml of PFS-2 (Solvay Solexis) was used to extract the product twice. The PFS-2 layers were then combined and washed with 20 ml of methanol twice. 20 Gm of the product, (N-(2-hydroxyethyl)-N'-1H, 1H, 2H, 2H-perfluorodecyl isonicotinamide Krytox® carboxylate PNC1), was obtained after the solvent was stripped off. The purity of the product was confirmed by IR.

Preparation 4: Synthesis of FNC1

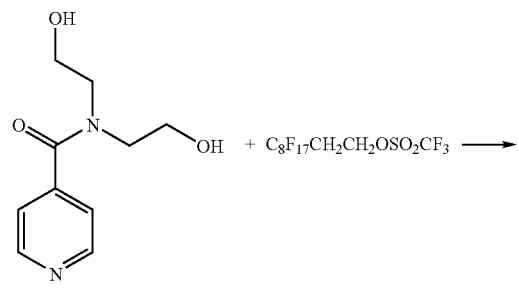

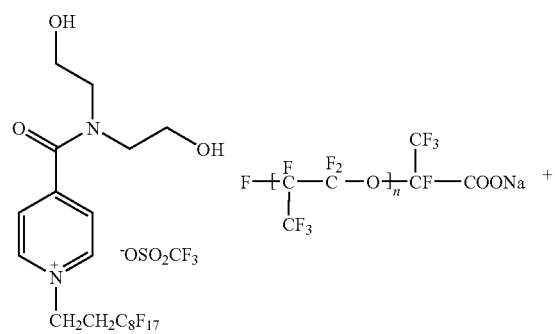

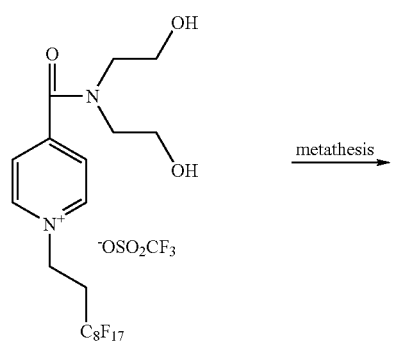

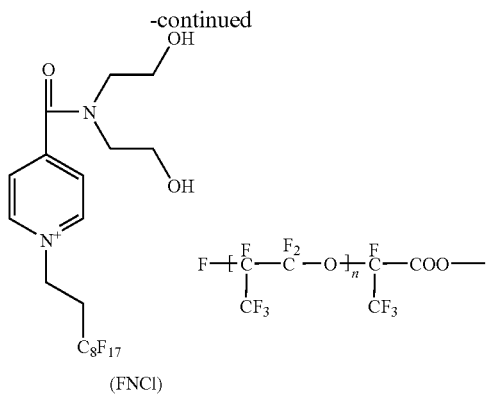

(FNCl)

36 Gm (0.06 mol) of 1H,1H, 2H, 2H-perfluorodecyl triflate was dissolved in 50 ml of 1,1,2-trichlorotrifluoroethane and 200 ml of acetonitrile. The solution was stirred and heated to 40° C. while 12.7 gm (0.06 mol) of N,N-bis(2-hydroxyethyl) isonicotinamide was added in three portions during a period of three hours. The solution was kept stirring at 40° C. for another three hours. After evaporation of the solvent, 45 gm of a white powder, N,N-bis(2-hydroxyethyl)-N'-1H, 1H, 2H, 2H-perfluorodecyl isonicotinamide, was obtained. The product and purity were confirmed by $^1$HNMR and $^{19}$FNMR.

10 Gm of sodium salt of Krytox 157FSL was dissolved in 100 ml of methanol, to which 3.9 gm of fluorocarbon modified pyridinium salt, N,N-bis(2-hydroxyethyl)-N'-(3,3,4,4,5,5,6,6,7,7,8,8,9,9,10,10-heptadecafluoro-decyl) isonicotinamide trifluoromethanesulfonate, was added and dissolved. The appearance of two phases was observed. The methanol solution was extracted twice with 100 ml of PFS2. The combined PFS2 layer was extracted with 50 ml of methanol twice, dried over sodium sulfate, filtered and stripped of solvent to yield 9 gm of the product. The spectrum of $^{19}$FNMR showed all of the triflate counterion was replaced with Krytox carboxylate.

Preparation 5: Preparation of PJC1

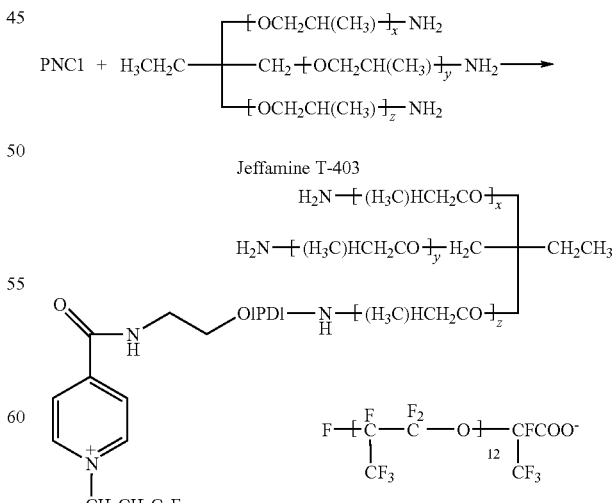

PJC1

To a solution containing 9.3 gm of PNC1 (from Preparation 3) in 40 ml of Freon 113 was added 1.33 gm of isophorone diisocyanate and 0.067 gm of 2% dibutyltin dilaurate acetone solution. The solution was heated to reflux under Ar for 12 hours. The solvent Freon113 was then stripped off. The residue was dissolved in 40 ml of PFS-2 and washed with 20 ml of ethyl acetate twice. The separated PFS-2 layer was then added dropwise to a solution of 3 gm of Jeffamine® T-403 (Huntsman) in 20 ml of Freon 113. The solution was continuously stirred for two hours till IR showed disappearance of the peak at 2200 cm$^{-1}$. The solvent was stripped off under vacuum and the residue was dissolved in 50 ml of PFS-2. 20 Ml of ethyl acetate was used to wash the PFS-2 layer three times. The combined PFS-2 layer was evaporated under vacuum to yield 10 gm of a red oil. The purity was confirmed by IR.

Preparation 6: Preparation of LiPFH

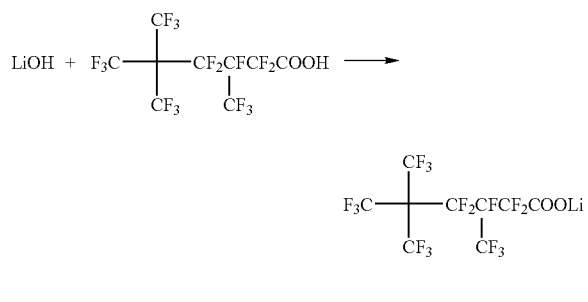

4.64 Gm of perfluoro-3,5,5-trimethylhexanoic acid (Syn-Quest, 84% min) was dissolved in 15 ml of methanol. To this solution was added 0.24 gm of lithium hydroxide. The mixture was ultrasonicated for one minute until most of the solid disappeared. The pH was measured by pH paper and then titrated with acid until pH value was close to 7. Filtration through the filter paper and evaporation of the solvent yielded 4.0 gm of a white solid.

Preparation 7: Preparation of LiK

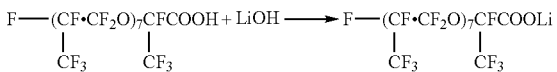

5 Gm of Krytox® acid (Du Pont, MW=1400) was dissolved in 20 ml of methanol and was continuously stirred at room temperature. A lithium hydroxide solution (0.09 gm/3 ml of deionized water) was added into the acid solution until the pH of the solution reached 7. After the solvent was removed under vacuum, 5 gm of a viscous liquid (LiK) was obtained. The purity of the compound was confirmed by $^{19}$F NMR.

Preparation 8: Preparation of CuPc Dye

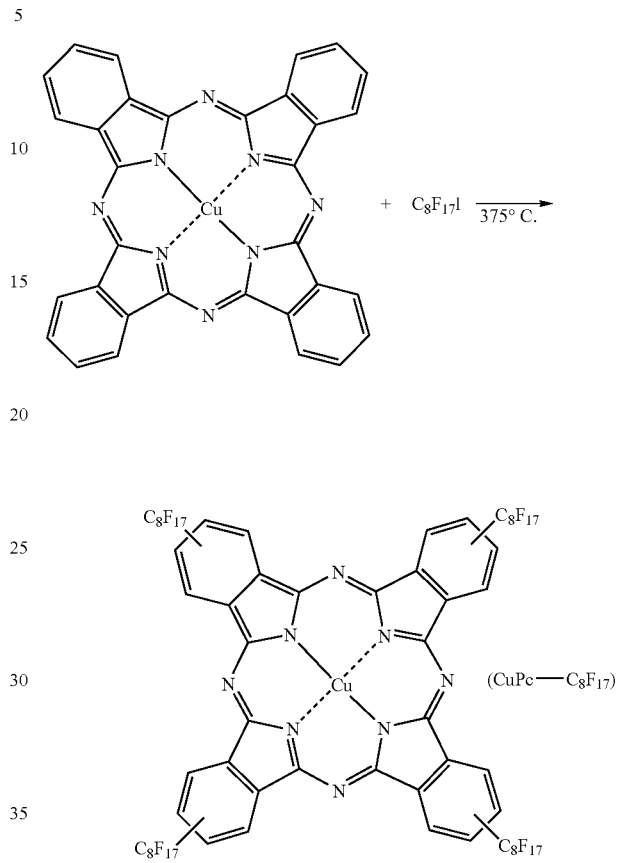

The fluorinated Cu phthalocyanine dye was prepared according to U.S. Pat. No. 3,281,426.

A mixture of 41 gm of copper phthalocyanine blue (Irgalite Blue BLPO, from Ciba Geigy) and 390 gm of 1-iodoperfluorooctane (from SynQuest) in a glass liner was loaded into a 1-gallon pressure reactor (from Parr Instrument). The reactor was sealed and heated to 60° C., then purged with argon and vacuumed at 60° C. After the purge and vacuum was repeated 5 times, the reactor was placed in the heater slot such that a thermal couple probe was in contact with the center of the reactor bottom. The reactor was then heated to 375° C. and held at 375° C. for 31 hours, then was cooled to room temperature. The crude product was extracted with Galden PFS-2 (from Solvay Solexis) in a Soxhlet extractor. The dark blue solution was washed with acetone several times until the acetone wash was colorless. The washed dark blue solution was filtered through a 0.45 μm filter under vacuum. The filtrate was concentrated at 60° C. under vacuum (about 60 Torr) to a slurry in a rotary evaporator. The slurry was dried under high vacuum, 0.5 to 1 Torr, at 60° C. overnight. The dried product was sublimed at 120° C. under high vacuum, 0.5 to 1 Torr, for 2 hours. A dark blue solid was obtained.

Preparation 9: Preparation of DK1 Dye

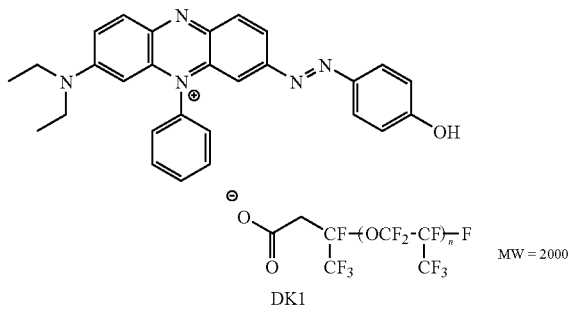

DK1    MW = 2000

A mixture of 1.00 gm (2.10 mmol, Aldrich) Diazine Black and 4.2 gm (2.10 mmol) of sodium Krytox carboxlate (prepared from Krytox acid and NaH as described in Preparation 3) was mixed in 50 ml of methanol at room temperature for 24 hours. The resulting mixture was extracted with 20 ml of PFS-2 (Solvay Solexis), washed with 10 ml of water twice and then washed with 10 ml of acetone five times. The resulting organic layer was separated, dried with anhydrous $Na_2SO_4$ and evaporated to concentrate by rotary evaporation. The residue obtained was Soxhlet extracted with diethyl ether, and then PFS-2. The resulting PFS-2 extract was evaporated to dryness by rotary evaporation. The desired 2.50 gm of a blackish oil was obtained (yield 38%). UV-Vis (HT200): $\lambda_{max}$, 560 nm; Absorbance, 0.18 at 40 ppm.

Preparation 10: Preparation of 2,3,12,13-Tetra(perfluorooctyl)-5,10,15,20-Copper Tetraphenylporphyrin (PK3 Dye)

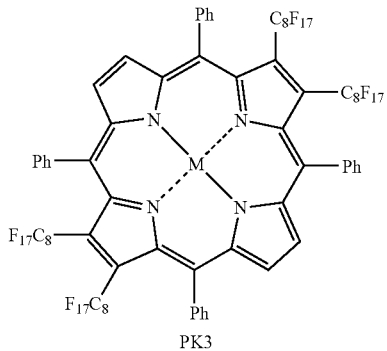

PK3

A. Synthesis of 2,3,12,13-Tetrabromo-5,10,15,20-Tetraphenylporphyrin

NBS (N-bromosuccinimide, 4.34 gm, 24.4 mmol) was added to a refluxing solution of tetraphenylporphyrin (2.5 gm, 4.07 mmol) in 150 ml of chloroform (ethanol free). The mixture was kept under reflux overnight and then cooled down. The volume of the solvent was reduced by ⅔ by rotary evaporation under a reduced pressure. The resulting mixture was then subjected to a short alumina plug (grade III). The impurities were washed out with methylene chloride, while the desired compound was kept on top of the plug. The compound was washed down using methylene chloride/trifluoroacetic acid (3:1) and neutralized with triethylamine. The volume of the solvent was reduced. The desired compound was crystallized by partition of methanol, with a yield of 3.6 gm (94%).

B. Synthesis of 2,3,12,13-Tetrabromo-5,10,15,20-Tetraphenylporphyrin-Cu(II)

2,3,12,13-Tetrabromo-5,10,15,20-tetraphenylporphyrin (1.3 gm, 1.4 mmol) was dissolved in chloroform (110 ml); a solution of $Cu(OAc)_2$ (2.23 g, 11.2 mmol) in methanol (30 ml) was then added. The resulting mixture was heated to reflux for one day and then cooled down, after which the solvent was removed. The residue was sonicated with methanol. After filtration, the solid, which was the desired compound, was washed with methanol and water until the washing was colorless. The product was obtained as purple crystals (yield, 1.3 gm, 94%).

C. Synthesis of PK3

7.8 Gm of iodoperfluorooctane (13.8 mmol, SynQuest) was added into the mixture of 2,3,12,13-tetrabromo-5,10,15,20-tetraphenylporphyrin-Cu(II) (3.0 gm, 3.02 mmol) and copper (1.7 gm, 24.16 mmol, Aldrich) in 37 ml of DMSO under Argon. The resulting suspension was refluxed for three days, and then filtered. The filtrate was mixed with 30 ml of water and extracted with 50 ml of PFS-2 three times. The PFS-2 extract was combined, washed with 75 ml of water three times, with 75 ml of acetone three times and evaporated to dryness by rotary evaporation. The obtained solid was chromatographed (silica gel, 5×7.5 cm, eluent: PFS-2/diethyl ether (1:2)) and evaporated to dryness by rotary evaporation. 5.22 Gm of a green solid was obtained (73% yield). UV-Vis (HT200): $\lambda_{max}$: 420 nm; Absorbance: 3.2 at 40 ppm.

Preparation 11: Preparation of L2ME

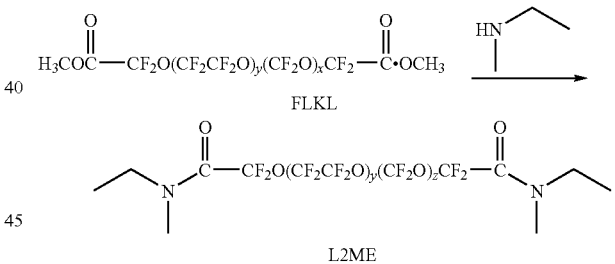

FLKL

L2ME

A mixture of Fluorolink L (19.65 gm) (perfluoro ethylether methylether dimethyl ester, from Solvay Solexis, MW=2000) and ethylmethylamine (11.8 gm) was stirred at room temperature for 48 hours. The excess of ethylmethylamine was removed by a rotary evaporator. The crude product was dissolved in the PFS2 solvent and washed with ethyl acetate two times. The PFS2 phase was then dried over $Na_2SO_4$ and in vacuo to yield 15.01 gm of the product.

Preparation 12: Preparation of LS1

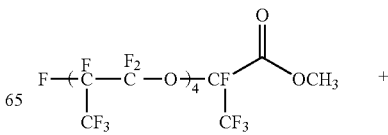

+

-continued

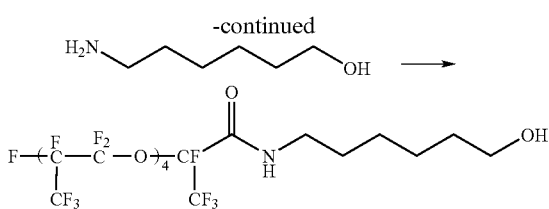

8.37 Gm of methyl ester of perfluoro-2,5,8,11-tetramethyl-3,6,9,12-tetraoxapentadecanoic acid and 3.49 gm of 6-aminohexanol were dissolved in a solvent containing 20 ml of trifluoro-trichloroethane (A113, $CF_2Cl$—$CFCl_2$) and 30 ml of isopropyl alcohol. The reaction mixture was stirred for 16 hours, then the solvent was evaporated. The reaction mixture was kept under vacuum for another 30 minutes. The crude product was dissolved in 50 ml of ethyl acetate and washed with 30 ml of 1 N HCl solution once, water twice and then brine once. The organic layer was dried over sodium sulfate. The solvent was evaporated to yield 8.44 gm of a colorless liquid. The structure was confirmed by HNMR.

Preparation 13: Preparation of $TiO_2$-Containing Microparticle A

Preparation of the Internal Phase:

8.93 Gm of Desmodur® N3400 aliphatic polyisocyanate (from Bayer AG) was dissolved in 5.78 gm of acetone (99.9%, from Burdick & Jackson) and homogenized for 10 seconds with a rotor-stator homogenizer (IKA ULTRA-TURRAX T25, IKA WORKS) at ambient temperature. To the resultant solution, 13.61 gm of $TiO_2$ (Ti-Pure® R706, from DuPont) was added and homogenized for 2 minutes. To the resultant $TiO_2$ dispersion, a solution containing 1.42 gm of 1,5-pentanediol (BASF), 0.30 gm of triethanolamine (99%, Dow), 2.75 gm of polypropylene oxide (MW=725, from Aldrich), 0.2 gm of F8POH (prepared from Preparation 2), 0.08 gm of $LiOT_f$ (lithium trifluoromethanesulfonate, 97%, from Lancaster) and 1.25 gm of acetone was added and homogenized for 1 minute. 0.37 Gm of a 2% dibutyltin dilaurate (Aldrich) solution in acetone was then added and homogenized for 1 minute and 30 seconds.

Emulsification, Phase Inversion and Post Curing:

In the final step, a solution containing 50.0 gm of HT-200 (from Solvay Solexis) and 2.25 gm of $R_f$-amine4900 (from Preparation 1) was added to the $TiO_2$/oligomer dispersion prepared above and homogenized for 4 minutes. The resultant microparticle dispersion was then heated at 80° C. and stirred under low shear to post cure the microparticles overnight.

The post-cured microparticle dispersion was filtered through a 30-μm Nylon net filter (Millipore) and the solid content of the filtered dispersion was measured by an IR-200 Moisture Analyzer (Denver Instrument Company). The filtered dispersion was used to prepare an electrophoretic dispersion.

Preparation 14: Preparation of $TiO_2$-Containing Microparticle B

The procedure for the preparation of the internal phase in Preparation 13 was followed, except that (1) F8POH and $LiOT_f$ were eliminated. In the emulsification/phase inversion step, a solution containing 12.5 gm of HT-200 and 0.25 gm of PJC1 (from Preparation 5) was added to the $TiO_2$/oligomer dispersion and homogenized for 1 minute. To the mixture, a solution containing 37.5 gm of HT200 and 2.25 gm of $R_f$-amine4900 (from Preparation 1) was added and homogenized for 4 minutes. The resultant microparticle dispersion was then heated at 80° C. and stirred under low shear to post cure the microparticles overnight and filtered through a 30-μm Nylon net filter (Millipore).

Preparation 15: Preparation of $TiO_2$-Containing Microparticle C

The procedure for the preparation of the internal phase in Preparation 13 was followed, except that the 0.2 gm of F8POH and 0.08 gm of $LiOT_f$ were replaced by 0.08 gm of $LiNT_f$ (lithium bis(trifluoromethanesulfonate)imide, from SynQuest Lab). In the emulsification/phase inversion step, a solution containing 50 gm of HT200 (Solvay Solexis) and 2.65 gm of $R_f$-amine4900 (from Preparation 1) was added to the $TiO_2$/oligomer dispersion and homogenized for 4 minutes. The resultant microparticle dispersion was then heated at 80° C. and stirred under low shear to post cure the microparticles overnight and filtered through a 30-μm Nylon net filter (Millipore).

Preparation 16: Preparation of $TiO_2$-Containing Microparticle D 7.14 Gm of Desmodur® N3400 aliphatic polyisocyanate (from Bayer AG) was dissolved in 5.4 gm of acetone. To the resultant solution, 13 gm of $TiO_2$ R706 (DuPont) was added and homogenized for 2 minutes with a rotor-stator homogenizer (IKA ULTRA-TURRAX T25) at room temperature, to which a solution containing 1.14 gm of 1,5-pentanediol (BASF), 0.24 gm of TEA (Dow), 2.20 gm of polypropylene oxide (MW=725 from Aldrich) and 1.0 gm of acetone was added and homogenized for 30 seconds. To the resultant solution, 0.29 gm of an acetone solution containing 2% dibutyltin dilaurate (Aldrich) was added and homogenized for 2 minutes. Finally, 40.0 gm of a HT-200 (Solvay Solexis) solution containing 0.9 gm of $R_f$-amine4900 (from Preparation 1) was added and homogenized for 2 minutes, followed by addition of 33.0 gm of a HT-200 solution containing 0.9 gm of $R_f$-amine4900 and homogenization for 2 minutes. The resultant microcapsule dispersion was then heated at 70° C. overnight and stirred under low shear to post cure the particles.

The post-cured microparticle dispersion was filtered through a 30-μm Nylon net filter (Millipore) and the solid content of the filtered dispersion was measured by an IR-200 Moisture Analyzer (Denver Instrument Company). The filtered dispersion was used to prepare an electrophoretic dispersion.

Preparation 17: Preparation of Electrophoretic Displays

A. Primer Coated Transparent Conductor Film

A primer coating solution containing 1.42 gm of Irostic® P9815 (polyurethane, Huntsman, Germany), 2.21 gm of CN983 (urethane diacrylate, Sartomer, Exton, Pa.), 1.10 gm of EB1290 (hexafunctional aliphatic urethane acrylate, UCB, Smyrna, Ga.), 0.13 gm of Irgacure™ 369 (2-benzyl-2-(dimethylamino)-1-[4-(4-morpholinyl)phenyl]-1-butanone, Ciba, Tarrytown, N.Y.), 0.13 gm of Sarcure SR1124 (isopropyl thioxanthone, Sartomer, Exton, PA), 0.03 gm of Irganox™ 1035 (thiodiethylene bis(3,5-di(tert)-butyl-4-hydroxyhydrocinnamate, Ciba Tarrytown, N.Y.), 80 gm of MEK (methyl ethyl ketone) and 15 gm of CHO (cyclohexanone) was mixed thoroughly and coated onto a 5 mil transparent conductor film (ITO/PET film, 5 mil OC50 from CPFilms, Martinsville, Va.) using a T#4 drawdown bar. The coated ITO film was dried in an oven at 65° C. for 10 minutes, and then exposed to 1.4 J/cm² of UV light under air using a UV conveyer (DDU, Los Angles, Calif.).

B. Preparation of Microcups

| Microcup Composition | | |
|---|---|---|
| Component | Weight Part | Source |
| EB 600 | 35.927 | UCB |
| SR 399 | 34.941 | Sartomer |
| HDDA | 22.337 | UCB |
| EB1360 | 6.503 | UCB |
| Irgacure 369 | 0.217 | Ciba |
| Sarcure SR1124 | 0.043 | Sartomer |
| Antioxidant Ir1035 | 0.033 | Ciba |

35.93 Gm of EB 600™ (acrylated epoxy oligomer, UCB, Smyrna, Ga.), 34.94 gm of SR 399™ (pentafunctional monomer, Sartomer, Exton, Pa.), 6.50 gm of EB1360™ (silicone acrylate, UCB, Smyrna, Ga.), 0.22 gm of Irgacure™ 369 (Ciba, Tarrytown, N.Y.), 0.043 gm of Sarcure SR1124 (ITX, Isopropyl-9H-thioxanthen-9-one, Sartomer, Exton, Pa.), 0.033 gm of Irganox™ 1035 (Ciba, Tarrytown, N.Y.) and 20.34 gm of HDODA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by centrifuge at 2000 rpm for about 15 minutes.

The microcup composition was slowly coated onto an 8"×8" electroformed Ni male mold for an array of 90 μm (length)×90 μm (width)×27 μm (depth)×11 μm (width of top surface of the partition wall between microcups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 17A, with the primer layer facing the Ni mold using a Hot Roll Laminator (ChemInstrument, Fairfield, Ohio) preset at a roller temperature of 200° F., lamination speed of 1 cm/sec and the roll pressure of 80 psi. A UV curing station with a UV intensity of 1.2 mw/cm² was used to cure the panel for 5.5 seconds. The ITO/PET film was then peeled away from the Ni mold at a peeling angle of about 30 degree to give a 8"×8" microcup array on ITO/PET. An acceptable release of the microcup array from the mold was observed. The thus obtained microcup array was further post-cured with a UV conveyor curing system (DDU, Los Angles, Calif.) with a UV dosage of 2.8 J/cm².

C. Filling and Sealing of the Microcups

An electrophoretic dispersion was filled into the microcup prepared from Preparation 17B using a #0 drawdown bar. The filled microcups were then overcoated with a top-sealing/adhesive solution consisting of 11.9 parts (dry) by weight of polyurethane IP9820-15, 2.1 parts by weight of CN983 (urethane diacrylate), 0.1 parts by weight of Irgacure 907 (2-methyl 1-[4-(methylthio)phenyl] 2-morpholinopropan-1-one), 40.8 parts by weight of MEK (methyl ethyl ketone), 40.8 parts by weight of IPAc (isopropyl acetate) and 4.3 parts by weight of CHO (cyclohexanone) with a doctor blade. The sealing layer was air-dried for 10 minutes and heated in an 80° C. oven for 2 minutes to form a seamless sealing on the filled microcup. The targeted (dry) thickness of the sealing layer was about 3~4 microns. The top-sealed microcups were laminated directly onto a 5 mil ITO/PET film by a laminator at 120° C. at a linear speed of 20 cm/min. After lamination, the sample was further UV cured by passing through a UV conveyer twice at the speed of 10 ft/min with a UV intensity of 2.56 W/cm² (which is equivalent to 0.856 J/cm²).

Electro-Optic Response of EPDs

The electro-optic response of all exemplified EPDs was measured by bringing an incoming light from an optical fiber cable connected to a light source and illuminating on a display sample prepared according to the procedure of Preparation 17. The back side of the display sample was blackened completely by a black paint.

The reflecting light from the display sample was then collected and converted into an electrical signal by a photoelectric detector and finally recorded and displayed on an oscilloscope. The intensity of output waveform correlates to the contrast ratio between the ON and OFF states of the display and the slope of optical output waveform reflects the response time of the display during switch.

Unless specified otherwise, all wt % mentioned in the electrophoretic dispersion is % dry weight based on the total weight of an electrophoretic dispersion.

EXAMPLES 1-3

Example 1 (Comparative Example—Control Sample)

Figure 1:
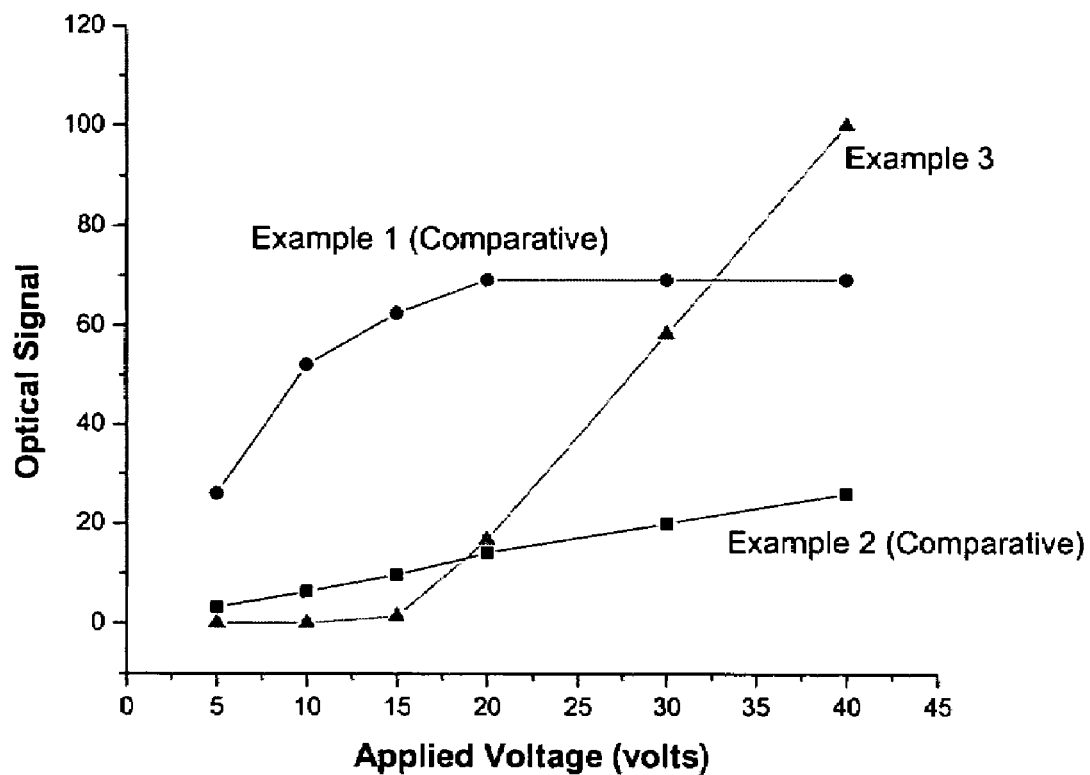
FIG. 1 summarizes the electro-optical response of Comparative Example 1 (the Control Sample), Comparative Example 2 and Example 3, measured from 0-40 volts.

An EPD sample was prepared according to the procedure of Preparation 17 and the cells were filled with an electrophoretic dispersion containing 9 wt % (dry) of the $TiO_2$-containing microparticles A (from Preparation 13) and 1.3 wt % (dry) of CuPc dye (from Preparation 8) in HT-200. The electro-optical responses from 0V to 40V are shown in FIG. 1. The electro-optical response of the electrophoretic dispersion indicates that the microparticles carried a positive charge with strong voltage dependence (i.e., sensitive to the change of the applied voltage). The optical signal or the mobility of the particles increased significantly with increasing applied voltage from 5-25 volts. No threshold voltage was observed since a strong optical signal was detected even at low driving voltages. The positive polarity of particle surface charge was also confirmed by electrophoresis in an ITO-glass cell separated with a 100 μm spacer.

Example 2 (Comparative Example)

The procedure of Example 1 was followed except that the EPD cells were filled with an electrophoretic dispersion containing 9 wt % (dry) of the $TiO_2$-containing microparticles A (from Preparation 13) and 2 wt % (dry) of the DK-1 (from Preparation 9) in HT-200. The electro-optical responses from 0V to 40V are also shown in FIG. 1. The $TiO_2$-containing microparticles carried a negative surface charge polarity as determined from their electro-optical responses. It is also evident that the voltage dependence of the negatively charged particles was much weaker (i.e., relatively insensitive to the change of the applied voltage) than that of the positively charged particles in Example 1. The system did not have the desirable threshold characteristics since the particle movement and optical signal were still detectable at all driving voltages.

Example 3

Threshold Induced by the Addition of Oppositely Charged Threshold Agent (DK-1)

The procedure of Example 1 was followed except that the EPD cells were filled with an electrophoretic dispersion containing 9 wt % (dry) of the $TiO_2$-containing microparticles A (prepared from Preparation 13), 1.3 wt % (dry) of the CuPc dye (prepared from Preparation 8) and 0.5 wt % of DK-1 (from Preparation 9) in HT-200. The electro-optical responses from 0V to 40V are also shown in FIG. 1. The electro-optical response of the electrophoretic dispersion indicates that the microparticles carried a positive charge with strong voltage dependence. As it can be seen from FIG. 1 that the particle movement at $\leq 15$ volts was completely suppressed by the addition of the oppositely charged threshold agent DK-1. At voltages higher than the threshold voltage (15 volts), the particle movement or the optical response increased rapidly as the applied voltage increased. It is evident that significant threshold characteristics of the electrophoretic dispersion of Example 1 was induced by the addition of 0.5 wt % of an oppositely charged but significantly less voltage dependent threshold agent, DK-1, into the dispersion. Example 3 showed a significant threshold characteristic as compared to Example 1 and Example 2.

EXAMPLES 4 and 5

Example 4 (Comparative Example)

Figure 2:
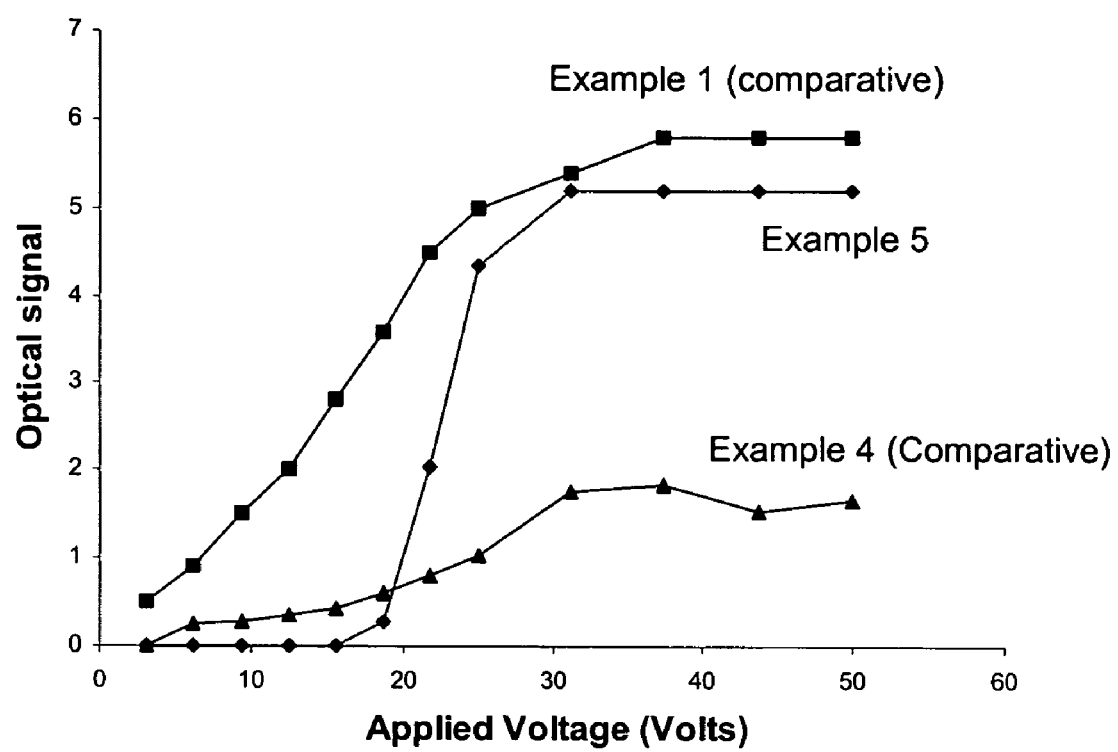
FIG. 2 summarizes the electro-optical response of Comparative Example 1, Comparative Example 4 and Example 5, measured from 0-50 volts.

The procedure of Example 1 was followed except that the EPD cells were filled with an electrophoretic dispersion containing 9 wt % (dry) of the $TiO_2$-containing microparticles A (from Preparation 13) and 0.5 wt % (dry) of the PK3 (from Preparation 10) in HT-200. The electro-optical responses from 0V to 50V are shown in FIG. 2. The $TiO_2$-containing microparticles carried a negative surface charge polarity as determined from their electro-optical responses. For comparison, the electro-optical responses of particles of Example 1 (Comparative Example—Control Sample) are also shown in FIG. 2. It is evident that the voltage dependence of the negatively charged particles was much weaker (i.e., relatively insensitive to the change of the applied voltage) than that of the positively charged particles of Example 1. The particles of Example 4 did not show the satisfactory threshold characteristics since the particle movement and optical signal were still detectable at low applied voltages.

Example 5

Threshold Induced by the Addition of Oppositely Charged Threshold Agent (PK3)

The procedure of Example 1 was followed except that the EPD cells were filled with an electrophoretic dispersion containing 9 wt % (dry) of the $TiO_2$-containing microparticles A (from Preparation 13), 0.5 wt % (dry) of CuPC dye (from Preparation 8) and 0.5 wt % (dry) of the PK3 (from Preparation 10) in HT-200. The electro-optical responses from 0V to 50V are also shown in FIG. 2. It can be seen from FIG. 2 that the particle movement at <18 volts was completely suppressed by replacing 0.8 wt % of the CuPc dye with 0.5 wt % of the oppositely charged threshold agent, PK3. At voltages higher than the threshold voltage (18 volts), the particle movement or the optical response increased rapidly as the applied voltage increased. It is evident that significant threshold characteristics of the electrophoretic dispersion of Example 1 was induced by the addition of 0.5 wt % of an oppositely charged but significantly less voltage dependent threshold agent, PK3, into the dispersion. Example 5 showed a significant threshold characteristic as compared to Example 1 and Example 4.

EXAMPLES 6 and 7

Example 6 (Comparative Example)

An EPD sample was prepared according to the procedure of Preparation 17 and the cells were filled with an electrophoretic dispersion containing 9 wt % (dry) of the $TiO_2$-containing microparticles B (from Preparation 14) and 1.25 wt % (dry) of CuPc dye (from Preparation 8) in HT-200. The electro-optical responses were measured from 0V to 40V. The particles exhibited a positive charge without threshold characteristics.

Example 7

Threshold Induced by Addition of Oppositely Charged Threshold Agent (LiPFH)

The procedure of Example 6 was followed except that 100-1500 ppm of the lithium salt, LiPFH (from Preparation 6) was post added to the electrophoretic dispersion. The electro-optical response was measured from 0V to 80V. It was observed that at low LiPFH concentrations (e.g., <100 ppm), the particles showed a positive surface polarity and at high concentrations (e.g., 700 ppm, 1000 ppm and 1500 ppm), the particles showed a negative surface charge polarity. No threshold voltage was found at both low and high LiPFH concentrations. However, when about 300 ppm of LiPFH was added, a threshold voltage of approximately 7 volts was observed. The L1 salt appeared to induce a negative charge on the positively charge microparticles. Post-addition of about 300 ppm of the negatively charged lithium salt to the positively charge microparticles appeared to neutralize the particles and effectively suppress the particle movement and electro-optical response at low applied voltages. As the applied voltage increased, the charge density of the positive charge on the particle surface increased dramatically and became predominate. As a result, the electro-optical response increased dramatically when the applied voltage was higher than the threshold voltage. The summary of particle surface charge properties is shown in Table 1.

TABLE 1

The threshold voltage and particle surface charge properties at different post added LiPFH concentrations.

| | LiPFH Concentration | | | | | |
|---|---|---|---|---|---|---|
| | 0 ppm | 100 ppm | 300 ppm | 700 ppm | 1000 ppm | 1500 ppm |
| Particle Charge Polarity | positive | positive | almost no electrophoretic mobility at $\leq 7$ volts, but | negative | negative | negative |

TABLE 1-continued

The threshold voltage and particle surface charge properties at different post added LiPFH concentrations.

| | LiPFH Concentration | | | | |
|---|---|---|---|---|---|
| 0 ppm | 100 ppm | 300 ppm | 700 ppm | 1000 ppm | 1500 ppm |
| | | | positively charged with high mobility at V > 7 volts | | |

In addition to the significant enhancement in threshold characteristics, the display contrast ratio, image bistability and electro-optic response time were also significantly improved when 300 ppm of LiPFH was post-added. The comparison of EPD performance with or without post-addition of LiPFH is summarized in Table 2.

TABLE 2

EPD performance comparison of Example 6 (without post-addition of LiPFH) and Example 7 (with post-addition of 300 ppm LiPFH)

| | Contrast Ratio | | Electro-Optic Response Time | | Image Bistability (% of image retention after power off) |
|---|---|---|---|---|---|
| | 20 V | 30 V | 20 V | 30 V | |
| Example 6 (Comparative) | 5.9 | 7.1 | 687 ms | 412 ms | 76% |
| Example 7 | 7.1 | 8.3 | 525 ms | 300 ms | 100% |

Other lithium salts, such as LiK (prepared by Preparation 7) or LiOTf (trifluoromethanesulfonate, 97%, from Lancaster) also showed a similar effect on threshold characteristics and performance.

Example 8

Threshold Characteristics Induced by Addition of Oppositely Charged Threshold Agent (LiK)

An EPD sample was prepared according to the procedure of Preparation 17 using an electrophoretic dispersion containing 9 wt % (dry) of the $TiO_2$-containing microparticles C (prepared from Preparation 15) and 1.25 wt % (dry) of CuPc dye (prepared from Preparation 8) in HT-200. 100-700 Parts per million of LiK (from Preparation 7) was post added to the electrophoretic dispersion. The electro-optical response was measured from 0V to 50V. It was observed that at low LiK concentrations (e.g., 100 ppm and 200 ppm), the particles showed a positive surface polarity but at high concentrations (e.g., 400 ppm, 700 ppm), the particles showed a negative surface charge polarity. No threshold voltage was found at the both low and high LiK concentrations. However, when 250 ppm of LiK was added, a threshold voltage of approximately 15 volts was observed. The Li salt appeared to induce a negative charge on the positively charge microparticles. Post-addition of about 250 ppm of the negatively charged lithium salt to the positively charge microparticles appeared to neutralize the particles and effectively suppress the particle movement and electro-optical response at low applied voltages. As the applied voltage increased, the charge density of the positive charge on the particle surface increased dramatically and became predominate. As a result, the electro-optical response increased dramatically when the applied voltage was higher than the threshold voltage.

Figure 3:
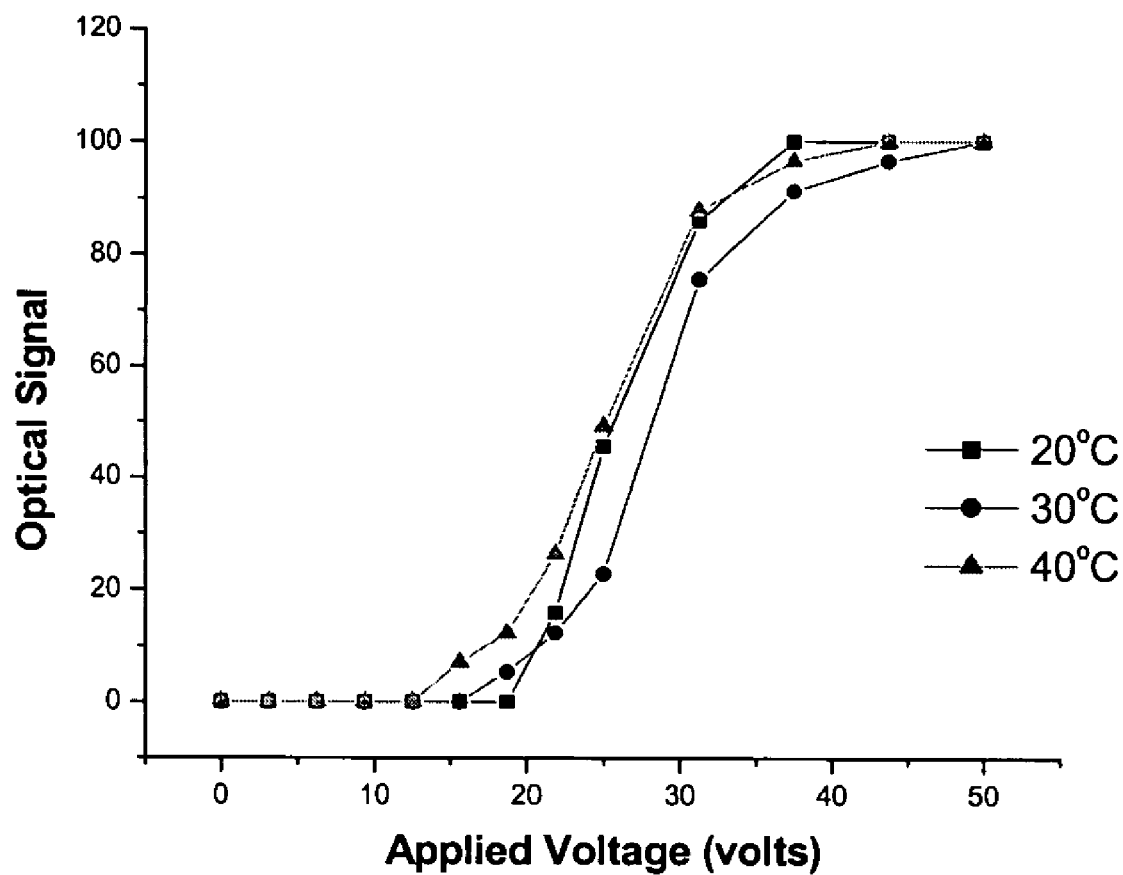
FIG. 3 summarizes the electro-optical response of Example 8 from 0 to 50 volts at operation temperatures from 20° C. to 40° C.

The particle surface charge property and threshold effect are summarized in Table 3. In addition to the significant enhancement in threshold characteristics, the contrast ratio, image bistability and electro-optic response time were also significantly improved when 250 ppm of LiK was post-added. Furthermore, the temperature latitude of the threshold voltage created by post-addition of LiK was also improved. The non-linear electro-optical responses from 0V to 50V were measured at different temperatures ranging from 20 to 40° C. FIG. 3 shows the threshold characteristics of Example 8 containing 250 ppm of LiK at different operating temperatures. The non-linear electro-optic response curves remained about the same from 20° C. to 40° C.

TABLE 3

The threshold characteristics and particle surface charge properties at different post added LiK concentrations.

| | LiK Concentration | | | | |
|---|---|---|---|---|---|
| | 0 ppm | 100 ppm | 250 ppm | 400 ppm | 700 ppm |
| Particle Charge Polarity | positive | positive | almost no electrophoretic mobility at <15 volts, but positively charged with high mobility at V > 15 volts | negative | negative |

Example 9

Threshold Characteristics Induced by Addition of Oppositely Charged Threshold Agent (L2ME)

The procedure of Example 1 was followed except that 3 wt % (based on the total dry weight of $TiO_2$-containing microparticles) of L2ME (from Preparation 11) was post-added into the electrophoretic dispersion. The polarity of particle surface charge was measured by electrophoresis in an ITO-glass cell separated with a 100 µm spacer at an applied voltage of 10-50 V. The electro-optical response and surface charge polarity of this dispersion were summarized in FIG. 4 and Table 4, respectively. For comparison, the electro-optical response and surface charge polarity of the particles of Example 1 (Comparative Example) are also included in Table 4 and FIG. 4.

As it can be seen in Table 4, the particles of Example 9 showed a negative surface charge polarity when measured at a voltage less than 30V, but a positive surface charge polarity at a voltage ≧30V.

TABLE 4

| | Polarity of particle surface charge as measured by electrophoresis | | | | |
|---|---|---|---|---|---|
| | 10 V | 20 V | 30 V | 40 V | 50 V |
| Example 1 | neutral to slightly positive | Positive | positive | positive | positive |
| Example 9 | negative | Negative | neutral or slightly positive | positive | positive |

Figure 4:
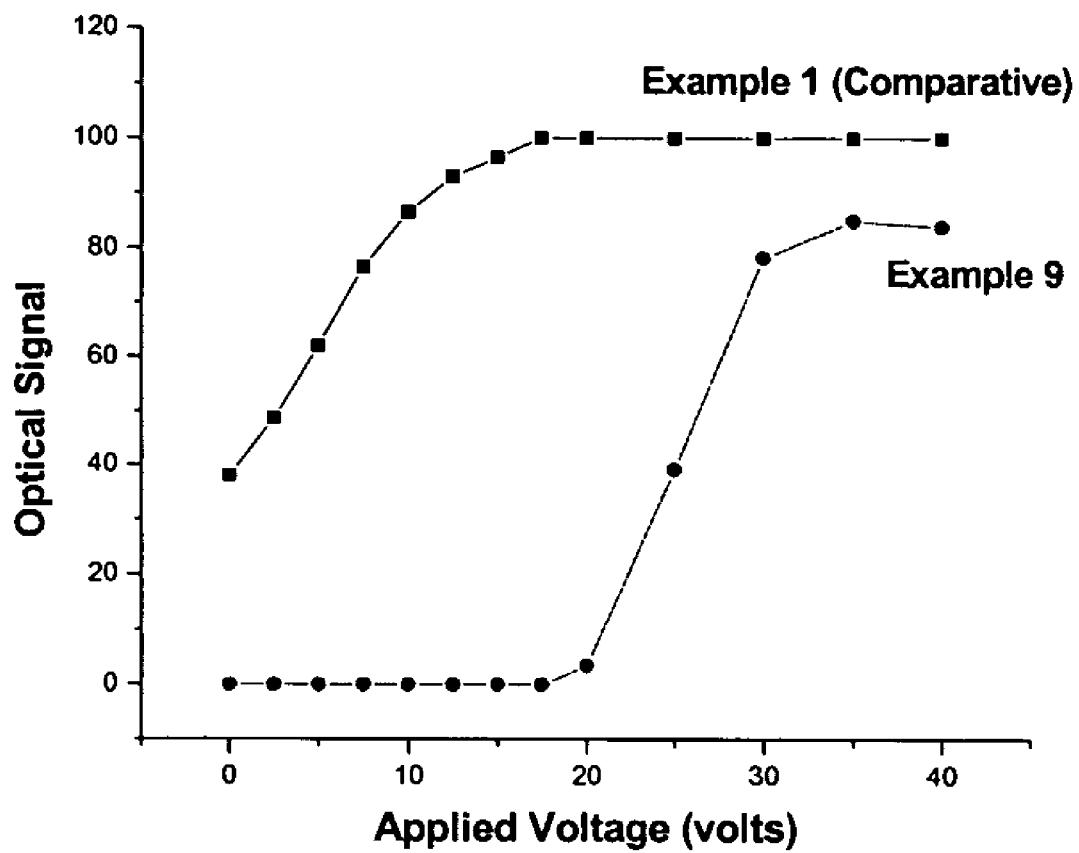
FIG. 4 summarizes electro-optical response of Comparative Example 1 and Example 9, measured from 040 volts.

As shown in FIG. 4, a significant threshold voltage was observed after post-addition of L2ME to the electrophoretic dispersion. Example 9 showed a significant threshold characteristics as compared to Example 1.

Figure 5:
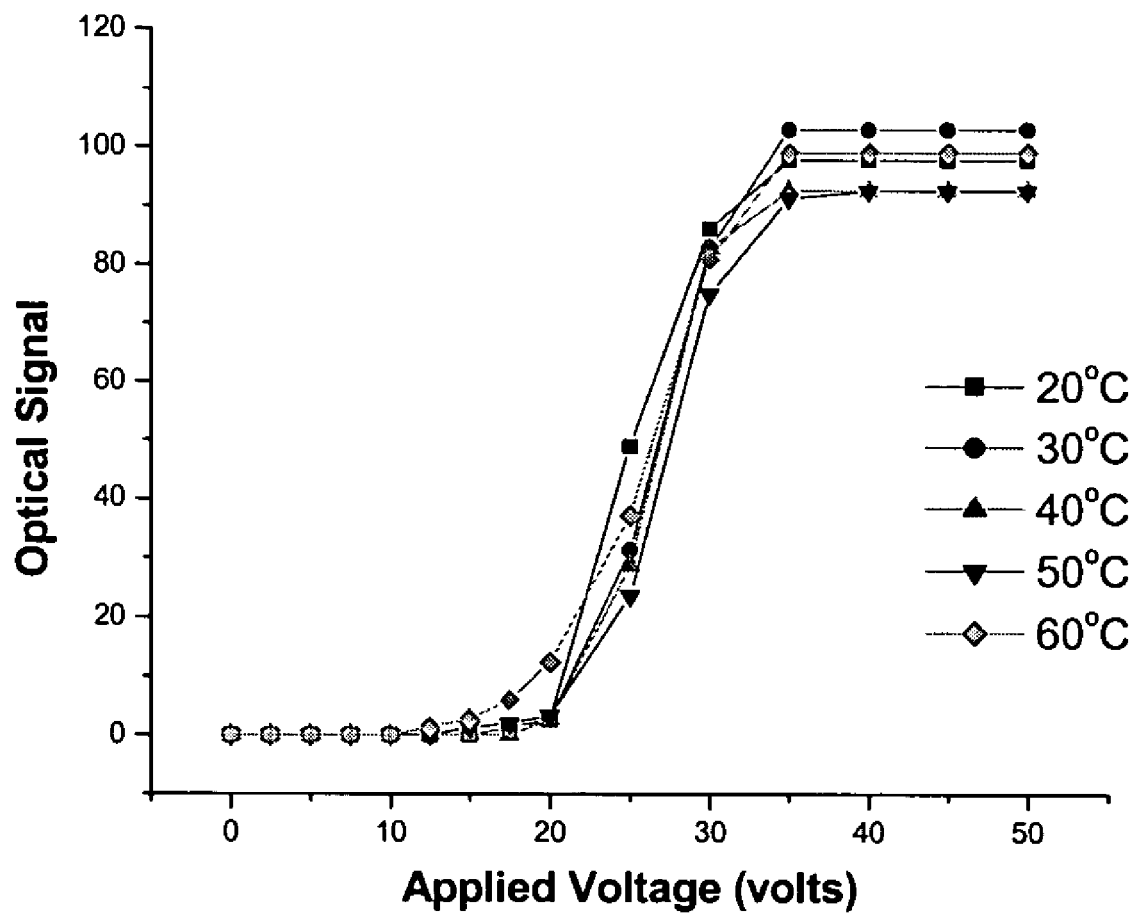
FIG. 5 summarizes electro-optical response of Example 9, measured from 0-50 volts at operation temperatures ranging from 20° C. to 60° C.

The non-linear electro-optical responses were measured at 20 to 60° C. and shown in FIG. 5. It is evident from FIG. 5 that the non-linear electro-optic response curves remained almost unchanged from 20° C. to 60° C.

EXAMPLE 10-12

Threshold Characteristics Induced by FNC1 or LS1

Example 10 (Comparative Example)

An EPD sample was prepared according to the procedure of Preparation 17 using an electrophoretic dispersion containing 9 wt % (dry) of the $TiO_2$-containing microparticles D (from Preparation 16) and 1.5 wt % (dry) of CuPc dye (from Preparation 8) in HT-200. The electro-optical response was measured from 0V to 40V. No threshold voltage was observed. The polarity of particle surface charge was positive as indicated by the electrophoresis of the particles.

Example 11

Addition of FNC1

The procedure of Example 10 was followed except that 250, 500, 1000 and 2000 ppm (based on the total weight of the electrophoretic dispersion) of FNC1 (from Preparation 4) was post added to the dispersion. The electro-optical response was measured from 0V to 80V. The polarity of particle surface charge was measured by electrophoresis in an ITO-glass cell separated with a 100 μm spacer at an applied voltage of 10-50 V. The results were summarized in Table 5. The polarity of the surface charge changed from positive to negative when the concentration of FNC1 increased from 0 to 2000 ppm. A threshold voltage of 7 volts was observed when about 250 ppm of FNC1 was added into the dispersion. The particle charge was positive with a fast electrophoretic mobility when the applied voltage was higher than 7 volts. However, the particle charge was negligible when the applied voltage was below 7 volts.

TABLE 5

The threshold voltage and particle surface charge properties as a function of FNC1 concentration

| | FNC1 Concentration | | | | |
|---|---|---|---|---|---|
| | 0 ppm | 250 ppm | 500 ppm | 1000 ppm | 2000 ppm |
| Particle Charge Polarity | positive | $V_{threshold}=$ 7 V | negative | negative | negative |

Example 12

Addition of LS1

The procedure of Example 10 was followed except that 300, 500, 1000 and 2000 ppm (based on total weight of the electrophoretic dispersion) of LS1 (from Preparation 12) was post added to the dispersion. The electro-optical response was measured from 0V to 80V. The polarity of particle surface charge was measured by electrophoresis in an ITO-glass cell separated with a 100 μm spacer at an applied voltage of 10-50 V. The results are summarized in Table 6. The polarity of the surface charge changed from positive to negative when the concentration of LS1 increased from 0 to 2000 ppm. A threshold voltage of 10 volts was also observed when 300 ppm of LS1 was added into the dispersion. The particle charge was positive with fast electrophoretic mobility when the applied voltage was higher than 10 volts. However, the particle charge was negligible when the applied voltage was below 7 volts.

TABLE 6

The threshold voltage and particle surface charge as a function of LS1 concentration.

| | LS1 Concentration | | | | |
|---|---|---|---|---|---|
| | 0 ppm | 300 ppm | 500 ppm | 1000 ppm | 2000 ppm |
| Particle Charge Polarity | positive | $V_{threshold}=$ 10 V | negative | negative | negative |

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. A method for inducing or enhancing the threshold voltage of an electrophoretic displays comprising the steps of:
   (i) forming an electrophoretic dispersion comprising electrophoretic pigment particles dispersed in a fluorinated dielectric solvent or solvent mixture selected from the group consisting of perfluoroalkanes, perfluorocycloalkanes, perfluoroarylalkanes, perfluoro-tert-amines, perfluoropolyethers, hydrofluoropolyethers, poly(chlorotrifluoroethylene), and trifluoro(trifluoromethyl)-oxirane homopolymers, wherein said fluorinated dielectric solvent or solvent mixture comprises a dye or pigment in addition to the electrophoretic pigments particles;
   (ii) adding a fluorinated threshold agent of fluorinated dyes or fluorinated pigments selected from the group consisting of phthalocyanine, naphthalocyanine, anthraquinone, perylene, quinacridone, diketopyrrolopyrrole, naphthalimide, diazine, polyaniline and porphyrin to the electrophoretic dispersion,
   wherein the fluorinated threshold agent carries a charge opposite the charge of the electrophoretic pigment particles in the electrophoretic dispersion, or the fluorinated threshold agent induces on the electrophoretic pigment particles a charge opposite the charge of the electrophoretic pigment particles in the electrophoretic dispersion; and
   (iii) filling the resulting electrophoretic dispersion of (ii) into display cells of the electrophoretic display.

2. The method of claim 1 wherein the charge of said electrophoretic pigment particles is positive and the charge provided by the fluorinated threshold agent is negative.

3. The method of claim 1 wherein the charge of said electrophoretic pigment particles is negative and the charge provided by the fluorinated threshold agent is positive.

4. The method of claim 1 wherein said fluorinated threshold agent is soluble in the fluorinated dielectric solvent or solvent mixture.

5. The method of claim 1 wherein said fluorinated threshold agent is dispersible in the fluorinated dielectric solvent or solvent mixture.

6. The method of claim 5 wherein the fluorinated threshold agent has a particle size at least about 4 times smaller than the electrophoretic pigment particles.

7. The method of claim 1 wherein said fluorinated threshold agent is absorbed onto the surface of the electrophoretic pigment particles.

8. The method of claim 1 wherein the electrophoretic pigment particles carry a charge of the same polarity, before and after addition of the fluorinated threshold agent and at a voltage beyond a threshold voltage.

9. The method of claim 1 wherein the electrophoretic pigment particles carry a charge of the same polarity as the charge provided by the fluorinated threshold agent, after addition of the fluorinated threshold agent and at a voltage beyond a threshold voltage.

10. The method of claim 1 wherein said electrophoretic pigment particles are charged primary pigment particles, pigment-containing particles, core-shell particles or hollow particles.

11. The method of claim 1 wherein said fluorinated dielectric solvent is a perfluoropolyether.

12. The method of claim 1 wherein the fluorinated dye or fluorinated pigment is present in about 0.01 to about 20% by weight based on the total dry weight of the electrophoretic pigment particles.

13. The method of claim 1 wherein when present in said electrophoretic dispersion, the charge of the fluorinated threshold agent is insensitive to the change of an applied voltage when the charge of the electrophoretic pigment particles in the electrophoretic dispersion is sensitive to the change of the applied voltage, or the charge of the fluorinated threshold agent is sensitive to the change of an applied voltage when the charge of the electrophoretic pigment particles in the electrophoretic dispersion is insensitive to the change of the applied voltage.

14. The method of claim 13 wherein the electrophoretic pigment particles show more than about $(120/V_{op})$% of change in charge density or electrophoretic mobility when there is a change of one volt of an applied voltage beyond a threshold voltage.

15. The method of claim 14 wherein the charge carried or induced by the fluorinated threshold agent shows less than about $(30/V_{op})$% of change in charge density of electrophoretic mobility when there is a change of one volt of the applied voltage beyond the threshold voltage.

16. The method of claim 14 wherein the charge carried or induced by the fluorinated threshold agent shows less than about $(15/V_{op})$% of change in charge density of electrophoretic mobility when there is a change of one volt of the applied voltage beyond the threshold voltage.

17. The method of claim 13 wherein the electrophoretic pigment particles show more than about $(150/V_{op})$% of change in charge density or electrophoretic mobility when there is a change of one volt of an applied voltage beyond a threshold voltage.

18. The method of claim 17 wherein the charge carried or induced by the fluorinated threshold agent shows less than about $(30/V_{op})$% of change in charge density of electrophoretic mobility when there is a change of one volt of the applied voltage beyond the threshold voltage.

19. The method of claim 17 wherein the charge carried or induced by the fluorinated threshold agent shows less than about $(15/V_{op})$% of change in charge density of electrophoretic mobility when there is a change of one volt of the applied voltage beyond the threshold voltage.

20. The method of claim 13 wherein the charge carried or induced by the fluorinated threshold agent shows more than about $(120/V_{op})$% of change in charge density or electrophoretic mobility when there is a change of one volt of an applied voltage beyond a threshold voltage.

21. The method of claim 20 wherein the electrophoretic pigment particles show less than about $(30/V_{op})$% of change in charge density of electrophoretic mobility when there is a change of one volt of the applied voltage beyond the threshold voltage.

22. The method of claim 20 wherein the electrophoretic pigment particles show less than about $(15/V_{op})$% of change in charge density of electrophoretic mobility when there is a change of one volt of the applied voltage beyond the threshold voltage.

23. The method of claim 13 wherein the charge carried or induced by the fluorinated threshold agent shows more than about $(150/V_{op})$% of change in charge density or electrophoretic mobility when there is a change of one volt of an applied voltage beyond a threshold voltage.

24. The method of claim 23 wherein the electrophoretic pigment particles show less than about $(30/V_{op})$% of change in charge density of electrophoretic mobility when there is a change of one volt of the applied voltage beyond the threshold voltage.

25. The method of claim 23 wherein the electrophoretic pigment particles show less than about $(15/V_{op})$% of change in charge density of electrophoretic mobility when there is a change of one volt of the applied voltage beyond the threshold voltage.

* * * * *

UNITED STATES PATENT AND TRADEMARK OFFICE
CERTIFICATE OF CORRECTION

PATENT NO. : 7,572,394 B2 Page 1 of 1
APPLICATION NO. : 10/976244
DATED : August 11, 2009
INVENTOR(S) : Gu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Seventh Day of September, 2010

David J. Kappos
*Director of the United States Patent and Trademark Office*